US009720998B2

(12) United States Patent
Wang et al.

(10) Patent No.: US 9,720,998 B2
(45) Date of Patent: Aug. 1, 2017

(54) MASSIVE CLUSTERING OF DISCRETE DISTRIBUTIONS

(71) Applicant: The Penn State Research Foundation, University Park, PA (US)

(72) Inventors: James Z. Wang, State College, PA (US); Yu Zhang, State College, PA (US); Jia Li, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 491 days.

(21) Appl. No.: 14/081,525

(22) Filed: Nov. 15, 2013

(65) Prior Publication Data

US 2014/0143251 A1 May 22, 2014

Related U.S. Application Data

(60) Provisional application No. 61/727,981, filed on Nov. 19, 2012.

(51) Int. Cl.
G06F 17/30 (2006.01)
(52) U.S. Cl.
CPC .............................. G06F 17/30598 (2013.01)
(58) Field of Classification Search
CPC ......... G06F 17/30598; G06F 17/30156; G06F 17/3071; G06F 17/30604; G06F 17/30327; G06F 17/30011; G06F 17/30589; G06F 17/30705; G06F 17/30867; G06F 17/30303
See application file for complete search history.

(56) References Cited

U.S. PATENT DOCUMENTS 5,832,182 A * 11/1998 Zhang ................. G06F 17/3025
382/226
6,374,251 B1 * 4/2002 Fayyad ............ G06F 17/30705
707/999.101

(Continued)

OTHER PUBLICATIONS

Julien, C. et al., Image and image-set modeling using a mixture model, *COMPSTAT* 2008, pp. 267-275, 2008.

(Continued)

*Primary Examiner* — Ashish K Thomas
*Assistant Examiner* — Rezwanul Mahmood
(74) *Attorney, Agent, or Firm* — Dinsmore & Shohl LLP

(57) ABSTRACT

The trend of analyzing big data in artificial intelligence requires more scalable machine learning algorithms, among which clustering is a fundamental and arguably the most widely applied method. To extend the applications of regular vector-based clustering algorithms, the Discrete Distribution (D2) clustering algorithm has been developed for clustering bags of weighted vectors which are well adopted in many emerging machine learning applications. The high computational complexity of D2-clustering limits its impact in solving massive learning problems. Here we present a parallel D2-clustering algorithm with substantially improved scalability. We develop a hierarchical structure for parallel computing in order to achieve a balance between the individual-node computation and the integration process of the algorithm. The parallel algorithm achieves significant speed-up with minor accuracy loss.

17 Claims, 15 Drawing Sheets

(56) References Cited

U.S. PATENT DOCUMENTS

| | | | | |
|---|---|---|---|---|
| 8,909,563 | B1* | 12/2014 | Jing | G06K 9/00664 |
| | | | | 382/180 |
| 9,336,302 | B1* | 5/2016 | Swamy | G06F 17/3071 |
| 2004/0117336 | A1* | 6/2004 | Basak | G06K 9/6282 |
| | | | | 706/52 |
| 2006/0259480 | A1* | 11/2006 | Zhang | G06F 17/30882 |
| | | | | 707/999.005 |
| 2006/0294101 | A1* | 12/2006 | Wnek | G06F 17/30011 |
| | | | | 707/999.007 |
| 2009/0055381 | A1* | 2/2009 | Wu | G06F 17/2745 |
| | | | | 707/999.005 |
| 2009/0182594 | A1* | 7/2009 | Choubey | 705/7 |
| 2009/0204637 | A1* | 8/2009 | Li | G06F 17/3025 |
| | | | | 707/999.107 |
| 2009/0327174 | A1* | 12/2009 | Honkala | G06F 3/0482 |
| | | | | 706/12 |
| 2010/0185695 | A1* | 7/2010 | Bekkerman et al. | 707/803 |
| 2010/0281166 | A1* | 11/2010 | Buyya et al. | 709/226 |
| 2012/0011124 | A1* | 1/2012 | Bellegarda | G06F 17/3071 |
| | | | | 707/739 |
| 2012/0088525 | A1* | 4/2012 | Kurokawa | H04W 4/028 |
| | | | | 455/456.5 |
| 2012/0268612 | A1* | 10/2012 | Wang | G06K 9/00624 |
| | | | | 348/207.1 |
| 2013/0101221 | A1* | 4/2013 | Fujiki | G06K 9/6284 |
| | | | | 382/195 |
| 2015/0199960 | A1* | 7/2015 | Huo | G10L 15/063 |
| | | | | 704/245 |

OTHER PUBLICATIONS

Kantabutra, S. et al., Parallel K-means clustering algorithm on NOWs, *NECTEC Technical Journal*, 1(6): 243-247, 2000.

Kislyuk, A. et al., Unsupervised statistical clustering of environmental shotgun sequences, *BMC Bioinformatics*, 10(1):316-331, 2009.

Li, J. et al., Real-time computerized annotation of pictures, *IEEE Transactions on Pattern Analysis and Machine Intelligence*, 30(6):985-1002, 2008.

Mallows, C., A note on asymptotic joint normality, *Annals of Mathematical Statistics*, 42(2):508-515, 1972.

Park, G. et al., GPLP: a local and parallel computation toolbox for gaussian process regression, *The Journal of Machine Learning Research*, 13:775-779, 2012.

Spielman, D. et al., Smoothed analysis of algorithms: Why the simplex algorithm usually takes polynomial time, *Journal of the ACM*, 51(3):385-463, 2004.

Wan, X., A novel document similarity measure based on earth mover's distance, *Information Sciences*, 177(18):3718-3730, 2007.

Wang, Y., et al., PLDA: Parallel latent Dirichlet allocation for large-scale applications, *In Proc. 5th International Conference on Algorithmic Aspects in Information and Management*, pp. 301-314, 2009.

Xu, D. et al., Video event recognition using kernel methods with multilevel temporal alignment, *IEEE Transactions on Pattern Analysis and Machine Intelligence*, 30(11):1985-1997, 2008.

Zhou, D. et al., A new Mallows distance based metric for comparing clusterings, *In Proc. 22nd International Conference on Machine Learning*, pp. 1028-1035, 2005.

\* cited by examiner (b) China (a) Animals (d) Halloween (c) Church

FIGURE 9

| | | | | |
|---|---|---|---|---|
| |  |  |  |  |
| Flickr concept | animals | winter | trees | mountains |
| Sequential D2 | birds texas dog museum garden | nikon san lake night autumn | family iphone barcelona usa black&white | snow barcelona winter beach river |
| Parallel D2 | animals zoo canon birthday mexico | trees love sunset night church | dog chicago cat portrait model | blue texas mountain snow rock |
| |  |  |  |  |
| Flickr concept | island | music | dog | city |
| Sequential D2 | scotland mountain rock car blue | river concert night england show | la toronto zoo museum lake | nyc church old sunset canada |
| Parallel D2 | lake uk ocean clouds mountains | band concert dance show black | zoo animals dog cat tour | architecture uk texas city trees |

MASSIVE CLUSTERING OF DISCRETE DISTRIBUTIONS

REFERENCE TO RELATED APPLICATION

This application claims priority from U.S. Provisional Patent Application Ser. No. 61/727,981, filed Nov. 19, 2012, the entire content of which is incorporated herein by reference.

STATEMENT OF GOVERNMENT SUPPORT

This invention was made with government support under Grant Nos. OCI1027854, IIS0347148, CCF0936948, and OCI0821527, awarded by the National Science Foundation. The government has certain rights in the invention.

FIELD OF THE INVENTION

This invention relates to data clustering and, in particular, to a parallel D2-clustering method performed as part of a dynamic hierarchical structure.

BACKGROUND OF THE INVENTION

Clustering is a fundamental unsupervised learning methodology for data mining and machine learning. Additionally, clustering can be used in supervised learning for building non-parametric models (Beecks et al., 2011). The K-means algorithm (MacQueen, 1967) is one of the most widely used clustering algorithms because of its simple yet generally accepted objective function for optimization. Though several variants of K-means have evolved recently, a fundamental limitation of K-means and those variants is that they only apply to the Euclidean space.

In many emerging applications, however, the data to be processed are not vectors. In particular, bags of weighted vectors (e.g., bags of words, bags of visual words, sparsely represented histograms), which can be formulated as discrete distributions with finite but arbitrary supports, are often used as object descriptors (Chen and Wang, 2004; Pond et al., 2010). The discrete distribution clustering algorithm, also known as the D2-clustering (Li and Wang, 2008), tackles such type of data by optimizing an objective function defined in the same spirit as that used by K-means. Specifically, it minimizes the sum of squared distances between each object and its nearest centroid. D2-clustering is implemented and applied in a real-time image annotation system named ALIPR (Li and Wang, 2008).

There are several ways to measure the closeness between two discrete distributions, such as Kullback-Leibler divergence (Cover and Thomas, 2012) and $L_1$ distance (Batu et al., 2013). Most metrics simply treat discrete distributions as regular histograms (after quantization if necessary) and measure their differences only by comparing the aligned bins among histograms. When the supports of discrete distributions are at arbitrary locations and of variable sizes, these metrics cannot effectively measure the distance because the supports of two distributions may not be aligned. In such situations, which are prevalent in applications using the bag-of-word representation, the transportation metric is useful because it measures the similarity by solving an optimal matching problem known as the transportation problem. The problem was initially formulated by French mathematician Monge (1781) and later by Russian mathematician Kantorovich (1942). The metric is known as the Kantorovich-Wasserstein metric. It also has several variants, as well as names, in part due to its wide application in different fields. Readers can refer to the book by Rachev and Ruschendorf (1998) for some of these applications. For example, the metric is better known as the earth mover's distance (EMD) (Rubner et al., 1998) in computer vision and the Mallows distance in statistics literature (Mallows, 1972). To simplify the discussion, hereafter we refer to the Kantorovich-Wasserstein metric as the Mallows distance.

The Mallows distance is robust to quantization noise and efficient with sparse representations. It is proved to be an effective metric for image retrieval and annotation. The D2-clustering algorithm is constructed based upon this distance and has been applied successfully to image annotation. In addition, this distance is also adopted in multiple data mining and machine learning applications such as video classification and retrieval (Xu and Chang, 2008), sequence categorization (Pond et al., 2010), and document retrieval (Wan, 2007), where objects are represented by discrete distributions. As a fundamental machine learning tool to group discrete distributions with Mallows distance, D2-clustering can be highly valuable in these areas.

A major concern in applying D2-clustering is its scalability. Because linear programming is needed in D2-clustering and the number of unknown variables grows with the number of objects in a cluster, the computational cost would normally increase polynomially with the sample size (assuming the number of clusters is roughly fixed). As a result, on a typical 2 GHz single-core CPU, ALIPR takes several minutes to learn each semantic category by performing D2-clustering on 80 images in it, but demands more than a day to complete the modeling of a semantic category containing thousands of training images. There are some alternative ways (Julien and Saitta, 2008; Yavlinsky et al., 2005) to perform the clustering faster, but they generally perform some indirect or sub-optimal clustering and hence lack the optimization properties of the D2-clustering.

The clustering problems researchers tackle today are often of very large scale. For instance, we are seeking to perform learning and retrieval on images from the Web containing millions of pictures annotated by one common word. This leads to demanding clustering tasks even if we perform learning only on a tiny fraction of the Web. Adopting bags of weighted vectors as descriptors, we can encounter the same issue in other applications such as video, biological sequence, and text clustering, where the amount of data can be enormous. In such cases, D2-clustering is computationally impractical.

Given the application potential of D2-clustering and its theoretical optimization advantages, it is of great interest to develop a variant of the algorithm with a substantially lower computational complexity, especially under a parallel computing environment. With the increasing popularity of large-scale cloud computing in real-world information systems, we are well motivated to exploit parallel computing.

K-Means Clustering

K-means is one of the most widely applied clustering algorithms on vectors. Given a set of N vectors $\vec{v}_1, \vec{v}_2, \ldots, \vec{v}_N$, K-means groups them into k clusters with centroids $\vec{z}_1, \vec{z}_2, \ldots, \vec{z}_k$. Each vector $\vec{v}_i$ is assigned with a clustering label $C(i)=j$, $j \in \{1, 2, \ldots, k\}$ if vi belongs to the j-th cluster. The objective of K-means clustering is to minimize the total within-cluster dispersion $$\epsilon = \sum_{j=1}^{k} \sum_{i: C(i)=j} \|\vec{v}_i - \vec{z}_j\|^2. \tag{1}$$

Both the labeling $C(\cdot)$ and the centroids $\vec{z}_j$'s are involved in the optimization. Because they interlace with each other in the optimization, they are iteratively updated in two stages. Within each iteration, $C(i)$ is updated by assigning each $\vec{v}_i$ with the label of its closest cluster centroid and then the centroid $\vec{z}_j$ for each cluster is updated by averaging the vectors attached to the cluster. For each of the two stages the updating decreases the objective in Eq. (1) monotonically. The iteration terminates when the objective stabilizes below a certain value, as defined in the stopping criteria.

Discrete Distributions and Mallows Distance

A discrete distribution gives the probability masses of a random variable at values within a finite set of range. It can be formulated by a bag of value-probability tuples at all possible values of the random variable. For instance, if a random variable v takes value at $v^{(1)}, v^{(2)}, \ldots, v^{(t)}$ with probability $p_v^{(1)}, p_v^{(2)} \ldots p_v^{(t)}$ ($\Sigma_{\alpha=1}^{t} p_v^{(\alpha)}=1$), the discrete distribution is written as $$v=\{(v^{(1)}, p_v^{(1)}), \ldots, (v^{(t)}, p_v^{(t)})\}.$$

Given another discrete distribution $u=\{(u^{(1)}, p_u^{(1)}), (u^{(1)}, p_u^{(1)}), \ldots, (u^{(t')}, p_u^{(t')})\}$, the Mallows distance $D(v,u)$ between v and u is solved by the following linear program:

$$D(u, v) = \left( \min_{\omega_{\alpha,\beta}} \sum_{\alpha=1}^{t} \sum_{\beta=1}^{t'} \omega_{\alpha,\beta} d^2(V^{(\alpha)}, u^{(\beta)}) \right)^{\frac{1}{2}}, \quad (2)$$

subject to:

$\Sigma_{\alpha=1}^{t} \omega_{\alpha,\beta} = p_u^{(\beta)}, \forall \beta=1, \ldots, t'$, $\Sigma_{\beta=1}^{t'} \omega_{\alpha,\beta} = p_v^{(\alpha)}, \forall \alpha=1, \ldots, t$, $w_{\alpha,\beta} \geq 0, \forall \alpha=1, \ldots, t, \forall \beta=1, \ldots, t'$.

In Eq. (2), $\omega_{\alpha,\beta}$ is the matching weights between the $\alpha$-th element in v and $\beta$-th element in u. We denote $d(v^{(\alpha)}, u^{(\beta)})$ as the distance between $v^{(\alpha)}$ and $u^{(\beta)}$ in the sample space of the random variable. If the sample space is a Euclidean space, $L^2$ norm is normally adopted as the measure, i.e., $d(v^{(\alpha)}, u^{(\beta)}) = \|v^{(\alpha)} - u^{(\beta)}\|$. Hereafter we assume that the random variable of a discrete distribution is sampled from an Euclidean space unless otherwise noted. In fact, the metric used by the sample space is not essential for the Mallows distance because what make the computation elaborate are the matching weights solved in the linear programming.

D2-Clustering

D2-clustering is a clustering algorithm for any collection of discrete distributions within the same sample space. Working in the same spirit as K-means, it also aims at minimizing the total within-cluster dispersion. Because the distances between discrete distributions are calculated using Mallows distance, the objective function to be minimized is the total squared Mallows distance between the data and the centroids.

Suppose there are N discrete distributions and k centroids, we denote the discrete distributions as the objective is then formulated as $$v_i=\{(v_i^{(1)}, p_{v_i}^{(1)}), \ldots, (v_i^{(t_i)}, p_{v_i}^{(t_i)})\}, i=1,2, \ldots, N,$$

and centroids as $$z_j=\{(z_j^{(1)}, p_{z_j}^{(1)}), \ldots, (z_j^{(s_j)}, p_{z_j}^{(s_j)})\}, j=1, \ldots, k,$$

the objective is then formulated as $$\epsilon=\Sigma_{j=1}^{k} \Sigma_{i:C(i)=j} D^2(z_j, v_i).$$

Although this optimization criterion is used by K-means, the computation in D2-clustering is much more sophisticated due to the nature of the Mallows distance, which is chosen because of its advantageous properties. The D2-clustering algorithm is analogous to K-means in that it iterates the update of the partition and the update of the centroids. There are two stages within each iteration. First, the cluster label of each sample is assigned to be the label of its closest centroid; and second, centroids are updated by minimizing the within-cluster sum of squared distances. To update the partition in D2-clustering, we need to compute the Mallow's distance between a sample and each centroid. To update the centroids, an embedded iterative procedure is needed which involves a large-scale linear programming problem in every iteration. The number of unknowns in the optimization grows with the number of samples in the cluster.

To update a certain centroid $z_j$ for a cluster of discrete distributions $v_1, v_2, \ldots, v_{n_j}$ attached to it, the following optimization is pursued.

$$\min_{z_j} \sum_{i}^{n_j} D^2(z_j, v_i) \quad (3)$$

where $z_j = \{(z_j^{(1)}, p_{z_j}^{(1)}), \ldots, (z_j^{(s_j)}, p_{z_j}^{(s_j)})\}$, $v_i = \{(v_i^{(1)}, p_{v_i}^{(1)}), \ldots, (v_i^{(t_i)}, p_{v_i}^{(t_i)})\}$, $D^2(z_j, v_i) = \min_{\omega_{\alpha,\beta}^{(i)}} \sum_{\alpha=1}^{s_j} \sum_{\beta=1}^{t_i} \|z_j^{(\alpha)} - v_i^{(\beta)}\|^2$ subject to:

$p_z^{(\alpha)} \geq 0, \alpha = 1, \ldots, s_j, \sum_{\alpha=1}^{s_j} p_{z_i}^{(\alpha)} = 1$, $\sum_{\beta=1}^{t_i} \omega_{\alpha,\beta}^{(i)} = p_{z_j}^{(\alpha)}, i = 1, \ldots, n_j, \alpha = 1, \ldots, s_j$, $\sum_{r=1}^{s_j} \omega_{\alpha,\beta}^{(i)} = p_{v_i}^{(\beta)}, i = 1, \ldots, n_j$, $\beta = 1, \ldots, t_i, \alpha = 1, \ldots, s_j$.

$\omega_{\alpha,\beta}^{(i)} > 0, i = 1, \ldots, n_j, \alpha = 1, \ldots, s_j, \beta = 1, \ldots, t_i$.

Because zj is not fixed in Eq. (3), we cannot separately optimize the Mallows distances $D(z_j, v_i)$, $i=1, \ldots n_j$, because $z_j$ is involved and the variables $\omega_{\alpha,\beta}^{(i)}$ for different i's affect each other through $z_j$. To solve the complex optimization problem, the D2-clustering algorithm adopts an iterative process as shown in Algorithm 1.

---

ALGORITHM 1: Centroid Update Process of D2-Clustering

Input: A collection of discrete distributions $v_1, v_2, \ldots, v_{n_j}$ that belong to cluster j.
Output: The centroid $z_j$ of the input discrete distributions in terms of Mallows distance.
begin
| while objective $\epsilon_j$ (defined in (3)) does not reach convergence do
| | Fix $z_j^{(\alpha)}$'s and update $p_{z_j}^{(\alpha)}$'s and $w_{\alpha,\beta}^{(i)}$'s in (3). In this case the
| | optimization reduces to a linear programming.
| | Fix $p_{z_j}^{(\alpha)}$'s and $w_{\alpha,\beta}^{(i)}$'s and update $z_j^{(\alpha)}$, $\alpha = 1, \ldots, s_j$. In this
| | case the solution of $z_j^{(\alpha)}$'s to optimize (3) are simply weighted
| | averages:

-continued

ALGORITHM 1: Centroid Update Process of D2-Clustering $$z_j^{(\alpha)} = \frac{\sum_{i=1}^{n_j}\sum_{\beta=1}^{l_i} w_{\alpha,\beta}^{(i)} v_i^{(\beta)}}{\sum_{i=1}^{n_j}\sum_{\beta=1}^{l_i} w_{\alpha,\beta}^{(i)}}, \alpha = 1, \ldots s_j.$$

Calculate the objective function $\epsilon_j$ in (3) using the updated $z_j^{(\alpha)}$'s, $p_{z_j}^{(\alpha)}$'s and $w_{\alpha,\beta}^{(i)}$'s.

end
end

Inside the "while" loop of Algorithm 1, the linear programming in line 1 is the primary cost in the centroid update process. It solves $p_{z_j}^{(\alpha)}, \omega_{2,\beta}^{(i)}, \alpha=1, \ldots, s_j, i=1, \ldots, n_j, \beta=1, \ldots, t_i$, a total of $s_j + s_j \Sigma_{i=1}^{n_j} t_i \approx n_j s_j^2$ parameters when $s_j$ is set to be the average of the $t_i$'s. The number of constraints is $1+n_j s_j + \Sigma_1^{n_j} t_i \approx 2n_j s_j$. Hence, the number of parameters in the linear program grows linearly with the size of the cluster. Because it costs polynomial time to solve the linear programming problem (Spielman and Teng, 2004), D2-clustering has a much higher computational complexity than K-means algorithm.

The analysis of the time complexity of K-means remains an unsolved problem because the number of iterations for convergence is difficult to determine. Theoretically, the worst case time complexity for K-means is $\Omega(2^{\sqrt{n}})$(Arthur and Vassilvitskii, 2006). Arthur et al. (2011) show recently that K-means has polynomial smoothed complexity, which reflects the fact that K-means converges in a relatively short time in real cases (although no tight upper or lower bound of time complexity has been proved). In practice, K-means usually converges fast, and seldom costs an exponential number of iterations. In many cases K-means converges in linear or even sub-linear time (Duda et al., 2012). Kumar et al. (2010) present a random sampling and estimation approach to guarantee K-means to compete in linear time. Although there is still a gap between the theoretical explanation and practice, we can consider K-means an algorithm with at most polynomial time.

Although the D2-clustering algorithm interlaces the update of clustering labels and centroids in the same manner as K-means, the update of centroids is much more complicated. As described above, to update each centroid involves an iterative procedure where a large-scale linear programming problem detailed in (3) has to be solved in every round. This makes D2-clustering polynomially more complex than K-means in general.

SUMMARY OF THE INVENTION

The computational intensiveness of D2-clustering limits its usages to only relatively small scale problems. With emerging demands to extend the algorithm to large-scale datasets, e.g., online image datasets, video resources, and biological databases, this invention exploits parallel processing in a cluster computing environment in order to overcome the inadequate scalability of D2-clustering.

In broad and general terms, to reduce the computational complexity of D2-clustering, we apply a 'divide-and-conquer' strategy in a novel parallel algorithm. With some approximation, we parallelize the centroid update in D2-clustering by a similar strategy to K-means' parallelization: dividing the data into segments based on their adjacency, computing some local centroids for each segment in parallel, and combining the local centroids to a global centroid. Heuristically we can obtain a close estimation of the optimal centroid, considering that the notion of centroid is exactly for a compact representation of a group of data.

Since both the dividing of the data and the combining of local centroids involves linear programming, the solution is not simple. We therefore adopt a reduced version of D2-clustering to perform the data segmentation efficiently, and disclose a hierarchical structure to keep the combination operation from becoming a large-scale linear programming. In particular, we introduce a hierarchical structure to conduct parallel computing recursively through multiple levels. This way, we can control the scale of linear programming in every segment and at every level.

In accordance with the method, we perform an initial segmentation of data points and a series of discrete distribution (D2) clustering operations to determine the local centroids of each segment. The local centroids are combined into one data set, and we perform a segmentation of this data set. The segmentation of the data points may be based upon adjacency. These steps are iteratively repeated at higher levels in a hierarchy, if necessary, until a single segmentation of the data points is achieved, the number of centroids is reduced to an acceptable level, or another stopping criterion is satisfied.

The D2 clustering operations may be performed by parallel processors, or by a single processor in sequence. Alternatively, a master processor may perform the initial data segmentation step and distributes the data segments to different parallel slave processors to perform the D2-clustering at each level in the hierarchy. Synchronized Message Passing Interface (MPI) and/or MapReduce techniques may be used for message passing and data transmission between the master and slave processors. The algorithms have many practical applications, including data points associated with images, video, biological processes and genetic sequence.

BRIEF DESCRIPTION OF THE DRAWINGS

FIG. 9 shows examples of concept prediction using the models built by the sequential and parallel D2-clustering results;

DETAILED DESCRIPTION OF THE PREFERRED EMBODIMENTS

Figure 1:
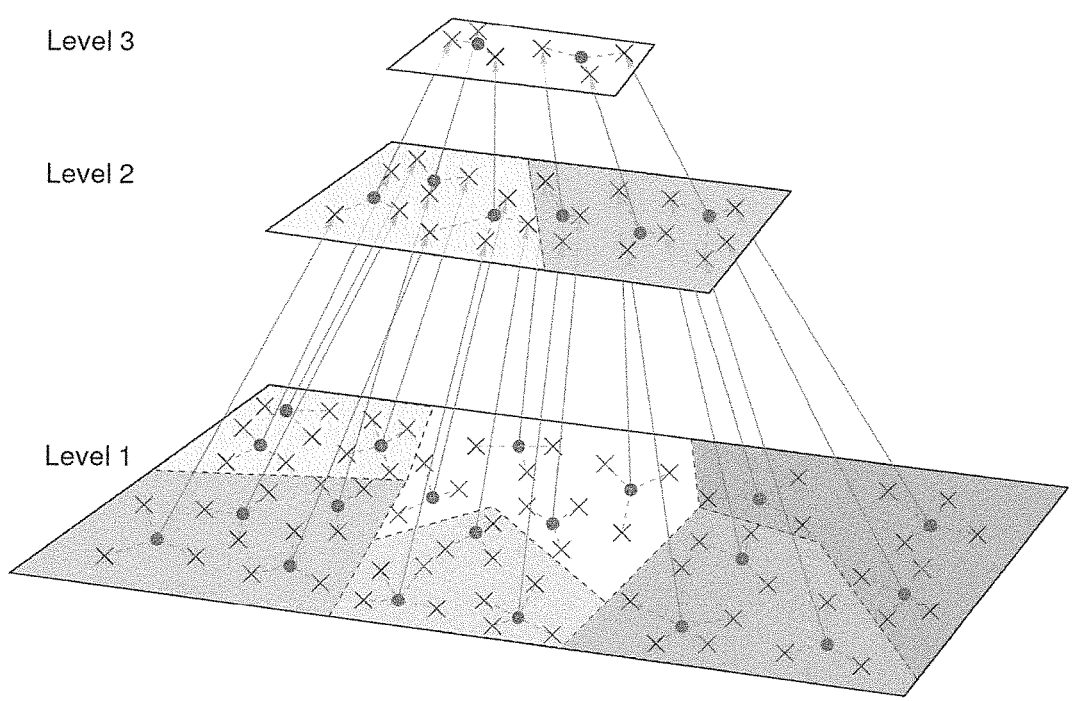
FIG. 1 illustrates the hierarchical structure used for parallel processing, wherein input data are denoted by crossings at the bottom level (Level 1)

Table I compares D2-clustering with several basic clustering algorithms in machine learning. D2-clustering runs on discrete distributions which K-means cannot handle. It is also more preferable over agglomerative clustering (Johnson, 1967) and spectral clustering (Ng et al., 2002) when cluster prototypes are needed. The main disadvantage of D2-clustering is the high time complexity. The parallel D2-clustering algorithm listed on the last column of the table keeps most of D2-clustering's properties with minor approximation, and improves the time complexity to a much lower order.

TABLE I

Comparison of Basic Clustering Approaches

| Method | K-means Clustering | Agglomerative Clustering | Spectral Clustering | D2-Clustering | Parallel D2-Clustering |
|---|---|---|---|---|---|
| Data type | Vectors | Any type | Any type | Discrete distributions | Discrete distributions |
| Provide prototypes | Yes | No | No | Yes | Yes |
| Based on pair-wise distances | No | Yes | Yes | No | No |
| Global Optimization | Yes | No | No | Yes | Yes, with approximation |
| Time Complexity | Linear | Quadratic | Cubic | Polynomial | Linearithmic |

Notations

This disclosure inherits the notations used above. Discrete distributions are in bold font. $v_i$'s with index i denote the discrete distributions to be clustered, and $z_j$'s with index j are the labeling assignment function, where $C(i)=j$ means data point r: belongs to the cluster with centroid $z_j$.

To reduce the computational complexity of D2-clustering, we apply the divide-and-conquer strategy in our new parallel algorithm. Divide-and-conquer is a general strategy for algorithm acceleration in many applications. And Parallelization is one of the most well adopted technique to implement the divide-and-conquer structure. There are several recent parallel algorithms (Chang et al., 2009; Wang et al., 2009; Tamada et al., 2011; Park et al., 2012) that attempt to reduce the overall processing time for large-scale data by distributing parallel processes to different computation units. Particularly for K-means, within each iteration both the labeling and centroid update stages can be naturally parallelized (Dhillon and Modha, 2000; Kantahutra and Couch, 2000). The parallelization of D2-clustering, however, is not straightforward because the centroid update optimization is not losslessly separable, though the cluster label of each point can still be optimized separately.

The centroid update for both K-means and D2-clustering is to find an optimized centroid for each cluster with the objective that the sum of squared distances from the centroid to each data point in the cluster is minimal. For K-means, the optimized centroid for each cluster is simply the arithmetic mean of the data points in it, which can be obtained by averaging the separately computed local means of different data chunks. For D2-clustering, a linear program described by (3) has to be solved to get the optimized centroid. Unlike K-means' centroid update, which is essentially a step of computing an average, the computation of a centroid in D2-clustering is far more complicated than any linear combination of the data points. Instead, all the data points in the corresponding cluster play a role in the linear programming problem in Eq. (3). To the best of our knowledge, there is no mathematical equivalence of a parallel algorithm for the problem.

With some approximation, we devise a novel approach to parallelize the centroid update in D2-clustering by a similar strategy to K-means' parallelization: dividing the data into segments based on their adjacency, computing some local centroids for each segment in parallel, and combining the local centroids to a global centroid. Heuristically we can get a close estimation of the optimal centroid in this way, considering that the notion of centroid is exactly for a compact representation of a group of data. Hence, a centroid computed from the local centroids should represent well the entire cluster, although some loss of accuracy is expected.

Both the dividing of data and combining of local centroids involve linear programmings and are hence not simple. We adopt a reduced version of D2-clustering to perform the data segmentation efficiently, and propose a hierarchical structure to keep the combination operation from becoming a large-scale linear programming.

Particularly for implementation, parallel computing techniques, such as Message Passing Interface (MPI) (Thakur et al., 2005) and MapReduce (Dean and Ghemawat, 2008) can be applied. In the current work, MPI is used to implement the parallel algorithm. The algorithm can also be implemented by other frameworks (e.g., MapReduce and Hadoop) if desired.

Parallel D2-Clustering Algorithm

In this section, we present the parallel D2-clustering algorithm. Hereafter, we refer to the original D2-clustering as the sequential algorithm. We will describe the hierarchical structure for speeding up D2-clustering and a weighted version of D2-clustering which is needed in the parallel algorithm but not in the sequential algorithm. We will also describe in detail the coordination among the individual computation nodes (commonly called the slave processors) and the node that is responsible for integrating the results (called the master processor). Finally, we analyze the convergence property and the computational complexity of the parallel algorithm. The D2-Clustering software packages for both single core and parallel processing, developed with the C programming language, are provided for readers to download and use in their own applications.

Algorithm Structure

To avoid the large linear programming problem in Eq. (3) when performing D2-clustering, we divide the large dataset into segments and perform local D2-clustering on each of them in parallel. These local clusters are then combined to achieve a global clustering result. Because the local cluster centroids are also discrete distributions, combining these local centroids also involves a linear programming. To achieve a low overall run-time, we want to keep both the local clustering tasks and the combination of local results at a small scale, which cannot be achieved simultaneously when the size of the overall data is large. As a result, we propose a hierarchical structure to conduct parallel computing recursively through multiple levels. This way, we can control the scale of linear programming in every segment and at every level.

FIG. 1 illustrates the hierarchical structure used for parallel processing. All input data are denoted by crosses at the bottom level (Level 1) in FIG. 1. Because of the large data size, these data points (each being a discrete distribution) are divided into several segments (reflected by different shadings in the figure) which are small enough to be clustered by the sequential D2-clustering. D2-clustering is performed within each segment. Data points in each segment are assigned with different cluster labels, and several cluster centroids (denoted by blue dots in the figure) are obtained. These cluster centroids are regarded as proper summarization for the original data. Each centroid approximates the effect of the data assigned to the corresponding cluster, and is taken to the next level in the hierarchy. At the new level they are treated as data themselves and being further clustered by the same way data are clustered at the previous level. The data size in the new level can still be large, although it should be much smaller than the original data size. Therefore, the algorithm may proceed to higher levels by repeating the same process, with the number of segments decreasing level by level. The granularity of the data becomes coarser and coarser as the algorithm traverses through the levels of the hierarchy.

The hierarchy terminates when the amount of data at a certain level is sufficiently small and no further clustering is needed. In FIG. 1 the data size at the third level is small enough for not proceeding to another level. The clusters at the highest level is then the final clustering result.

In short, at each level, except the bottom level, we perform D2-clustering on the centroids acquired from the previous level. Borrowing the terminology of a tree graph, we can call a centroid a parent point and the data points assigned to its corresponding cluster child points. The cluster labels of the centroids at a higher level are inherited by their child points, and propagate further to all the descendent points. To help visualize the tree, in FIG. 1, data points in one cluster at a certain level are connected to the corresponding centroid using dashed lines. And the red arrows between levels indicate the correspondence between a centroid and a data point at the next level. To determine the final clustering result for the original data, we only need to trace each data point through the tree and find the cluster label of its ancestor at the top level.

In such a hierarchical structure, the number of centroids becomes smaller and smaller as the level increases. Therefore, it is guaranteed that the hierarchy can terminate. In addition, because D2-clustering is conducted within small segments, the overall clustering can be completed quickly.

Initial Data Segmentation

We now describe the initial data segmentation method. In this step, we want to partition the dataset into groups all smaller than a certain size. The partitioning process is in a similar spirit as the initialization step of the LBG algorithm proposed by Linde et al. (1980), an early instance of K-means in signal processing. The whole dataset is iteratively split into partitions until a stopping criterion is satisfied. And within each iteration, the splitting is an approximation of, and computationally less expensive than, an optimal clustering.

Figure 2:
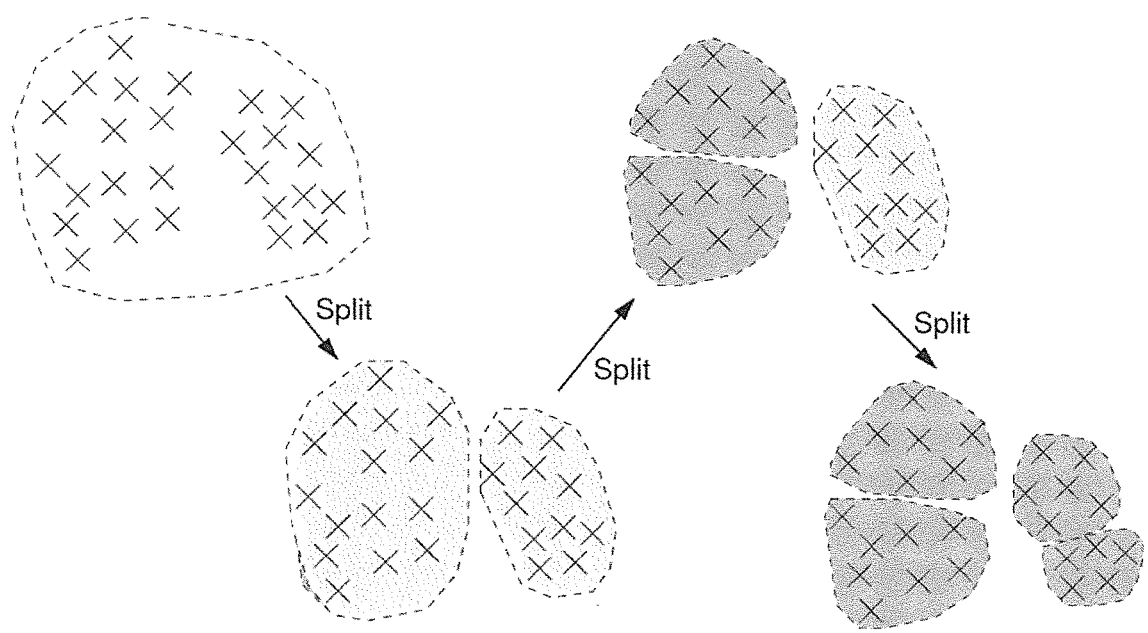
FIG. 2 illustrates an iterative process containing a series of binary splitting.

FIG. 2 illustrates the iterative process containing a series of binary splitting. Different from the initialization of the LBG algorithm, which splits every segment into two parts, doubling the total number of segments in every iteration, our approach only splits one segment in each round. The original data are split into two groups using a binary clustering approach (to be introduced later). Then we further split the segments by the same process repetitively. Each time we split the segment containing the most data points into two clusters, so on so forth. The splitting process stops when all the segments are smaller than a certain size.

As shown in FIG. 2, within each round of dividing a group of data into two segments, we aim at optimal clustering so that data points in each segment are close. On the other hand, this clustering step needs to be fast because it is a preparation before conducting D2-clustering in parallel. The method we use is a computationally reduced version of D2-clustering. It is suitable for clustering bags of weighted vectors. Additionally, it is fast because of some constraints imposed on the centroids. We refer to this version as the constrained D2-clustering.

The constrained D2-clustering is a reduced version of D2-clustering. We denote each data point to be clustered as $v_i\{(v_i^{(1)}, p_{v_i}^{(1)}), \ldots, (v_i^{(t_i)}, p_{v_i}^{(t_i)})\}$, $i=1, \ldots, n$, and k initial centroids as $z_j\{(z_j^{(1)}, p_{z_j}^{(1)}), \ldots, (z_j^{(s_j)}, p_{z_j}^{(s_j)})\}$, $j=1, \ldots, k$. Parameters $t_i$ and $s_j$ are the numbers of support vectors in the corresponding discrete distributions $v_i$ and $z_j$. And $C(i) \in \{1 \ldots k\}$ denotes the cluster label assigned to $v_i$. The D2-clustering and constrained D2-clustering algorithms are described in Algorithm 2.

---

ALGORITHM 2: D2-Clustering and Constrained D2-Clustering.

Input: A collection of discrete distributions $v_1, v_2, \ldots, v_n$
Output: k centroids $z_1, z_2, \ldots, z_k$ (also discrete distributions), and the clustering labels
$C(1), C(2), \ldots, C(n), C(\cdot) \in \{1, \ldots k\}$
begin
| Initialize k centroids.
| while objective function $\epsilon(C)$ does not reach convergence do
1 | | Allocate a cluster label to each data point vi by selecting the nearest centroid.
| | $C(i) = \arg\min_{j \in \{1, \ldots, k\}} D(v_i, z_j)$,
| | where $D(v_i, z_j)$ is the Mallows distance between $v_i$ and $z_j$).
2 | | (For D2-clustering only) Invoke Algorithm 1 to update $z_j$'s. The input data when updating a
| | certain $z_j$ are the discrete distributions $\{v_{i:C(i)=j}\}$ assigned to the cluster.

-continued

ALGORITHM 2: D2-Clustering and Constrained D2-Clustering.

```
2*    |  |  (For constrained D2-clustering only) Keep p_{z_j}^{(α)} =1/s_j, α =1, . . . , s_j fixed when invoking
      |  |  Algorithm 1 to solve z_j. The linear programming in line 1 of Algorithm 1 can thus be separated
      |  |  into several smaller ones and runs much faster. The result of z_j is a uniform weighted bag of
      |  |  vectors containing support vectors at optimized locations.
3     |  |  Calculate the with-cluster dispersion ε_j for each cluster j obtained by the previous label and
      |  |  centroid update steps. Then sum them up to get the objective:
      |  |  ε(C) = Σ_{j=1}^{k} ε_j.
      |  end
      end
```

The difference between D2-clustering and constrained D2-clustering is the way to update centroids in Step 2 of Algorithm 2. As discussed previously, we need to solve a large-scale linear programming problem in Algorithm 1 to update each $z_j$ in D2-clustering. The linear programming involves the optimization of $p_{z_j}^{(α)}$ and $ω_{α,β}^{(i)}$, $α=1, \ldots, s_j$, $β=1, \ldots, t_j$. i:C(i)=j($ω_{α,β}^{(i)}$ is the matching weight between the α-th vector of $z_j$ and the β-th vector of $v_i$). This makes D2-clustering computationally complex.

In the constrained D2-clustering algorithm, we replace Step 2 by Step 2* in the D2-clustering algorithm. We simplify the optimization of D2-clustering by assuming uniform $p_{z_j}^{(α)}=1/s_j$, $α=1, \ldots, s_j$, for any $j=1, \ldots, k$. With this simplification, in the linear programming problem in Step 1 of Algorithm 1, we only need to solve $ω_{α,β}^{(i)}$'s. Moreover, $ω_{α,β}^{(i)}$'s can be optimized separately for different i's, which significantly reduces the number of parameters in a single linear programming problem. More specifically, instead of solving one linear programming problem with a large number of parameters, we solve many linear programming problems with a small number of parameters. Due to the usual polynomial complexity of the linear programming problems, this can be done much faster than the original D2-clustering. Due to the usual polynomial complexity of the linear programming problems, this can be done much faster than the original D2-clustering.

Weighted D2-Clustering

Data segments generated by the initialization step are distributed to different processors in the parallel algorithm. Within each processor, a D2-clustering is performed to cluster the segment of data. Such a process is done at different levels as illustrated in FIG. 1.

Clustering at a certain level usually produces unbalanced clusters containing possibly quite different numbers of data points. If we intend to keep equal contribution from each original data point, the cluster centroids passed to a higher level in the hierarchy should be weighted and the clustering method should take those weights into account. We thus extended D2-clustering to a weighted version. As will be shown next, the extension is straightforward and results in little extra computation.

It is apparent that with weighted data, the step of nearest neighbor assignment of centroids to data points is unaffected, while the update of the centroids under a given partition of data is. Let us inspect the optimization in Eq. (3) for updating the centroid $z_j$ of one cluster. When data $v_i$ have weights $ω_i$, a natural extension of the objective function is $$\min_{z_j^{(α)}, p_{z_j}^{(α)}: 1 \leq α \leq s_j} \sum_{i=1}^{n_j} w_i D^2(z, v_i) \quad (4)$$

where $D(z_j, v_i)$ is defined in Eq. (3).

In Step 1 of Algorithm 1, we fix $z_j^{(α)}$, $α=1, \ldots, s_j$, and solve a linear programming problem with objective function (3) under the same constraints specified in Eq. (1) to get the vector weights $p_{z_j}^{(α)}$'s and a matching $ω_{α,β}^{(i)}$ between $z_j$ and each $v_i$, i:C(i)=f. Then in Step 2, the update for $z_j^{(α)}$ is revised to a weighted version:

$$z_j^{(α)} = \frac{\sum_{i:C(i)=j} w_i \sum_{β=1}^{t_i} ω_{α,β}^{(i)} v_i^{(β)}}{\sum_{i:C(i)=j} w_i \sum_{β=1}^{t_i} ω_{α,β}^{(i)}} \quad (5)$$

Because the optimal solution of centroid is not affected when the weights are scaled by a common factor, we simply use the number of original data points assigned to each centroid as its weight. The weights can be computed recursively when the algorithm goes through levels in the hierarchy. At the bottom level, each original data point is assigned with weight 1. The weight of a data point in a parent level is the sum of weights of its child data points.

Algorithmic Description

With details in several major aspects already explained earlier, we now present the overall flow of the parallel D2-clustering algorithm. The parallel program runs on a computation cluster with multiple processors. In general, there is a "master" processor that controls the flow of the program and some other "slave" processors in charge of computation for the sub-problems. In the implementation of parallel D2-clustering, the master processor performs the initial data segmentation at each level in the hierarchical structure specified in FIG. 1, and then distribute the data segments to different slave processors. Each slave processor clusters the data it received by the weighted D2-clustering algorithm independently, and send the clustering result back to the master processor. As soon as the master processor receives all the local clustering results from the slave processors, it combines these results and set up the data for clustering at the next level if necessary.

ALGORITHM 3: Master Side of Parallel D2-clustering.

Input: A collection of discrete distributions V = {$v_1, v_2, \ldots, v_N$}, the desired cluster number k, and the number of slave processors M (slaves are with identical indices 1, 2, . . . , M).
Output: k centroids Z = {$z_1, z_2, \ldots, z_k$} (also discrete distributions), and the clustering labels
C = {C(1), C(2), . . . , C(N)}, C(·) ∈ {1, . . . , k}
begin ALGORITHM 3: Master Side of Parallel D2-clustering.

```
     k' ← N; n ← N; Ṽ ← V; W = {w₁, w₂, ..., w_N} ← {1, 1, ..., 1}.
     while k' > k do
1-1     Segment the data objects Ṽ = {ṽ₁, ṽ₂, ..., ṽ_n} with weights W̃ = {w₁, w₂, ..., w_n} at current
        level into m groups, V₁, ..., V_m by the constrained D2-clustering algorithm (Algorithm 2). Each V_μ
        contains no more than τ entries, and the corresponding weights for data in
        V_μ = {v_{μ,1}, v_{μ,2}, ..., v_{μ,n_μ}} is denoted as W_μ = {w_{μ,1}, w_{μ,2}, ..., w_{μ,n_μ}} The indices of data
        entries assigned to segment Ṽ_μ are stored in array L_μ(·): L_μ(i') = i if ṽ_i = v_{μ,i'}.
        foreach data segment V_μ do
1-2        Send a clustering request signal to slave processor with index η = (μ mod M). The slave
           processor is notified with the number of data points n_μ, and the desired cluster number k_μ first.
           Then V_μ and W_μ are sent to slave η.
        end
2-1     Initialize loop parmeters. m_c ← 0; k' ← 0; Z ← ∅; C̃(i) ← 0, i = 1, ..., n.
        while m_c < m do
2-2        Wait for incoming message from any processor until getting the signal from slave η.
2-3        Receive segment id μ, cluster centroids Z_μ = {z_{μ,1}, ..., z_{μ,k_μ}}, and cluster labels
           C_μ = {C_μ(1), ..., C_μ(n_μ)} from slave η.
2-4        Merge Z_μ to Z by appending centroids in Z_μ to Z one by one.
2-5        Update cluster labels of data points in the receive segment by (6).
               C̃(L_μ(i)) = C_μ(i) + k', i = 1, ..., n_μ.                                    (6)
2-6        k' ← k' + k_μ; m_c ← m_c + 1.
        end
3-1     Update the cluster label of a data entry in the original dataset (bottom level), C(i), by inheriting
        label from its ancestor in Ṽ.
               C(i) = C̃(C(i)), i = 1, ..., N.
3-2     Update data points and weights for the clustering at the next level:
        Ṽ ← Z;
        w_i ← Σ_{α:C̃(α)=i} w_α, i = 1, ..., k'.
     end
     foreach η = 1, 2, ..., M do
        Send TERMINATE signal to the slave processor with id η.
     end
     return Z and C.
  end
```

The current work adopts MPI for implementing the parallel program. In order to keep a correct work flow for both master and slave processors, we use synchronized communication methods in MPI to perform message passing and data transmission. A processor can broadcast its local data to all others, and send data to (or receive data from) a specific processor. Being synchronized, all these operations do not return until the data transmission is completed. Further, we can block the processors until all have reached a certain blocking point. In this way, different processors are enforced to be synchronized.

Figure 3:
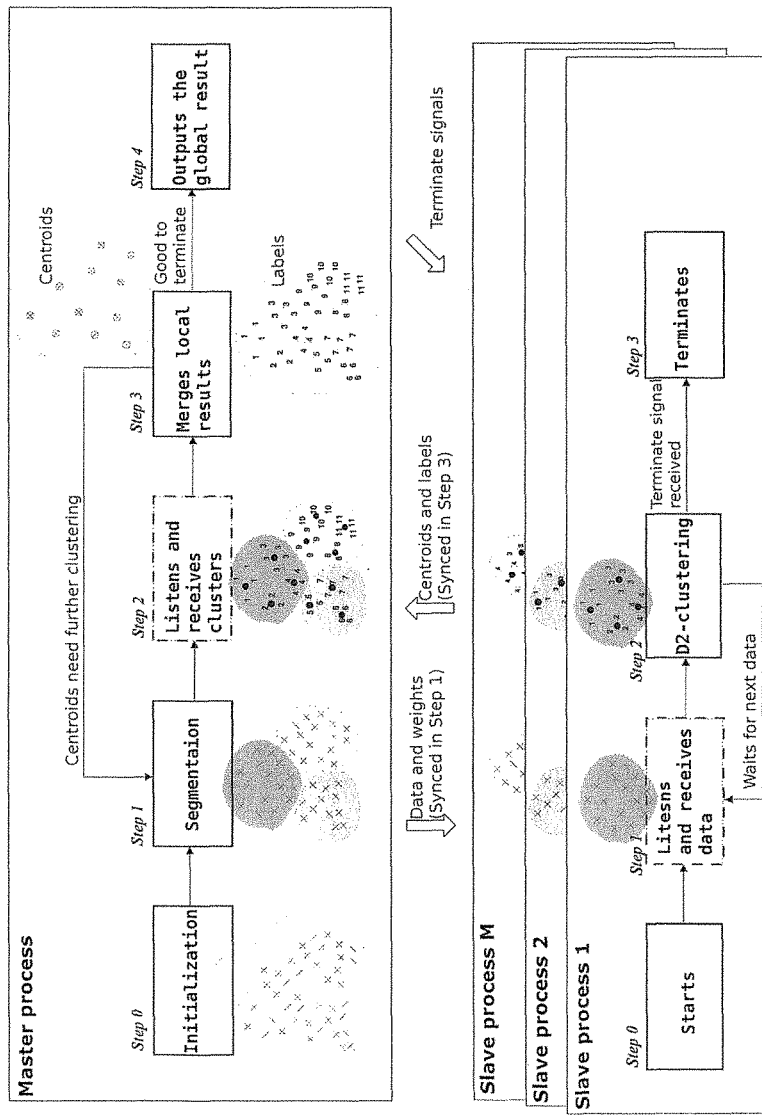
FIG. 3 depicts a work flow.

The algorithms running on the master and slave processors are formulated in Algorithms 3 and 4, respectively. FIG. 3 illustrates the algorithms on both sides in a visualized way. The master processor controls the work flow and makes the clustering work in a hierarchical way as described in FIG. 1.

The hierarchy is constructed by the outmost loop in Algorithm 3, in which the operations in line 3-1 and line 3-2 relate the data between adjacent levels. Inside each level, the master distributes the data to slave processors and is then blocked until it gets all the clustering results from the slave processors. Each slave processor is also blocked until it gets the clustering request and data from the master processor. After performing D2-clustering and sending the results back to the master processor, a slave processor returns to a blocked and waiting status. In short, both the master and the slave processors have a working stage to perform the computation and a blocked stage to wait for data from the other side, which is fulfilled by the synchronized communication. When one side of the master or slave is performing computation, the other side is blocked and waiting for the computation results.

ALGORITHM 4: Slave Side of Parallel D2-clustering (same process on each slave).

```
     begin
        while true do
1-1        Wait for signal from the master processor.
           if signal is TERMINATE then
              return.
           end
1-2        Receive data segment id μ, data in the segment V_μ = {v_{μ,1}, v_{μ,2}, ..., v_{μ,n_μ}} and the
           corresponding weights W_μ = {w_{μ,1}, w_{μ,2}, ..., w_{μ,n_μ}}.
2-1        Perform weighted D2-clustering on V_μ with weights W_μ by Algorithm 1 (using (4) and (5) when
           updating centroids).
2-2        Send a clustering complete signal to the master processor. Then Send μ, cluster centroids
           Z_μ = {z_{μ,1}, ..., z_{μ,k_μ}} and cluster labels C_μ = {C_μ(1), ..., C_μ(n_μ)} to the master processor.
        end
     end
```

In FIG. 3 and Algorithm 3, the loop in the master side (step 1 to step 3) constructs the hierarchical clustering structure level by level. Different levels work in the same manner, with $\tilde{V}$ and $\tilde{W}$ updated by the master process in line 3-1 and line 3-2 of Algorithm 3 after the clustering at the current level is completed (at the bottom level $\tilde{V}=V$ and $\tilde{W}=\{1, 1, \ldots, 1\}$). In step 1, the master process runs data segmentation and distribution specified in line 1-1 and line 1-2 of Algorithm 3, and the slave processors are blocked until they hear data from the master, which is formulated in line 1-1 and line 1-2 of Algorithm 4. Then both the master and slave processor proceed to step 2, in which the master waits for the clustering result from the slaves and combines the received results from different slaves (line 2-1 to line 2-6 in Algorithm 3), and the slave processors performs local D2-clustering (line 2-1 and line 2-2 in Algorithm 4). The master and slave processors go back to step 1 if the condition for the hierarchy to proceed is satisfied (judged by the master processor). Otherwise the master processor terminates the program and returns the clustering result.

Proof of Convergence and Termination

The convergence of the parallel D2-clustering algorithm depends on the convergence of the processes running on both the master and slave sides as described in Algorithms 3 and 4. The master process distributes data to different slave nodes and constructs the hierarchical structure level by level. Within each level, the parallel clusterings are done by the slave processes, during which time the master process is blocked and waiting for the completion of all the parallel slave tasks. Therefore, the convergence properties on both sides need to be proved in order to confirm the overall convergence.

Lemma 1:

The iteration on the master side (Algorithm 3) always terminates.

Proof:

In each iteration of Algorithm 3, n data points are divided to m groups. Each group $\rho$ with $n\mu$ data entries ($\Sigma_{\mu=1}^{m} n_\mu = n$) are clustered separately into $k\mu$ clusters. The total number of clusters for all slave clustering tasks is $k'=\Sigma_{\mu=1}^{m} k_\mu$. For each sub-task $\mu$, $k\mu < n\mu$. Therefore, $k < n$, which means the data points in the next iteration is always less than the data in the current level. In other words, the condition to terminate the hierarchy ($k' \leq k$) is satisfied within finite number of iterations.

The slave processes terminate once they receive the termination signal from the master, which is guaranteed by LEMMA 1 if the clustering within each level terminates. The convergence of both the master and slave processes is accordingly determined by the convergence of (weighted) D2-clustering performed in step 2-2 of Algorithm 4. The D2-clustering algorithm, as well as the weighted version which is mathematically equivalent, are formulated in Algorithm 2, whose convergence is proved below.

Lemma 2:

The centroid update operation described in Algorithm 1 converges in finite time.

Proof:

Algorithm 1 operates in two steps within each iteration: first, update $p_z^{(\alpha)}$'s and $\omega_{\alpha,\beta}^{(i)}$'s by solving a linear programming problem; second, update $z^{(\alpha)}$'s by computing a weighted sum. For the first step, the linear programming minimizes the objective function (3) with $z^{(\alpha)}$'s fixed, which completes in polynomial time. With all the costs and constraints in the linear program being positive, it is proved that the solution is unique (Mangasarian, 1979). In addition, Murty (1983) show that the solution for a linear program lies in one of the extreme points of the simplex spanned by the constraints. Assume at loop $l_1$ and loop $l_2$ of the iteration (l1=l2), the solutions for the linear program at step 1 are $$S_{l_1} = \{[p_z^{(\alpha)}]_{l_1}, [\omega_{\alpha,\beta}^{(i)}]_{l_1}, \alpha=1, \ldots, s_j, i=1, \ldots, n_j, \beta=1, \ldots, t_i\} \text{ and}$$

$$S_{l_2} = \{[p_z^{(\alpha)}]_{l_2}, [\omega_{\alpha,\beta}^{(i)}]_{l_2}, \alpha=1, \ldots, s_j, i=1, \ldots, n_j, \beta=1, \ldots, t_i\}$$

respectively. Using $S_{l_1}$ and $S_{l_2}$ step 2 obtains $Z_{l_1} = \{[Z^{(1)}]_{l_1}, \ldots, [Z^{(s_j)}]_{l_1}\}$ and $Z_{l_2} = \{[Z^{(1)}]_{l_2}, \ldots, [Z^{(s_j)}]_{l_2}\}$. However, before the algorithm reaches a convergence $\epsilon$ is strictly decreasing. Hence, $S_{l_1} \neq S_{l_2}$. Because the possible number of extreme points on the linear programming simplex is finite and each extreme point is never visited twice as proved above, the loop converges within finite time.

Lemma 3:

D2-clustering and constrained D2-clustering described in Algorithm 2 converge in finite time.

Proof:

It is proved in (Selim and Ismail, 1984) that a K-means-type algorithm always converges to a partial optimal solution in a finite number of iterations. Together with Lemma 2, Algorithm 2 converges in finite time.

Using Lemma 1, 2 and 3, we can conclude the convergence of the parallel D2-clustering algorithm.

Theorem 4:

The parallel D2-clustering algorithm described by Algorithms 3 (master process) and 4 (slave processes) can terminate within finite time.

Analysis and Proof of Time Complexity

In this section, we analyze the time complexity of the parallel D2-clustering algorithm because it is confirmed to converge.

As described earlier, for D2-clustering, the computational complexity of updating the centroid for one cluster in one iteration is polynomial in the size of the cluster. The total amount of computation depends on computation within one iteration as well as the number of iterations. Again, even for K-means clustering, the relationship between the number of iterations needed for convergence and the data size is complex. In practice, we often terminate the iteration after a pre-specified number of rounds (e.g., 500) if the algorithm has not converged before that. As a result, in the analysis of computational complexity, we focus on the time needed to complete one iteration and assume the time for the whole algorithm is a multiple of that, where the multiplication factor is a large constant.

Lemma 5:

When there are N discrete distributions in total and we want to cluster them into k clusters, the run-time for D2-clustering increases polynomially with N, and decreases polynomially with k.

Proof:

The linear programming to update a centroid is polynomial to the number of data points involved. Denote the order of polynomial as $\gamma$. Because the K-means-type clustering algorithms tend to form clusters with similar size, each cluster contains roughly N/k data entries. As a result, the centroid update of k cluster costs $O(k(N/k)^\gamma)$ time in total. Assume the number of iterations is linear to N, the clustering has polynomial run-time of $O(k^{1-\gamma} N^{1+\gamma})$.

When the number of discrete distributions grows and the number of clusters remains the same, the run-time grows in a polynomial order, which eventually makes D2-clustering slow and impractical in large-scale problems. In the proposed parallel algorithm, we divide data into segments at each level of the hierarchy. Each segment is no larger than τ in size, and clustered separately. Assume λ clusters are to be formed, the run-time of the D2-clustering within a single segment is $O(\lambda^{1-\gamma}\tau^{\gamma+1})$. Here τ is set to be a fixed number within which scale the sequential D2-clustering can efficiently work. The λ centroids are treated as data points at the next level and further clustered.

Define $$R = \frac{\tau}{\lambda},$$

which is the average number of data points within each cluster. It is also a factor that the data size shrinks at a certain level. The factor (referred as the shrinking factor thereafter) is important for the total run-time of the parallel D2-clustering algorithm.

Theorem 6:

The run-time for parallel D2-clustering is linearithmic to the total number of data points N.

Proof:

Based on Lemma5, each local sequential D2-clustering within a certain neighboring segment of data costs $O(\lambda^{1-\gamma}\tau^{\gamma+1}) = O(R^{\gamma-1}\tau^2)$ time.

In the ideal case, where there are always enough CPU cores to compute local clusterings in parallel, the total time for clustering is purely determined by the number of levels in the hierarchy of the parallel algorithm $L = \log_R N/k$ where R is the shrinking factor, N is the total number of data at the bottom level, and k is the desired number of clusters. And the clustering time is $$T_1 = O(R^{\gamma-1}\tau^2 L). \quad (7)$$

In practice, the hardware resources may be limited. At certain levels, especially lower levels of the hierarchy where the number of segments are large, not every segment can be assigned to an unique CPU core. Some segments have to share one CPU core and be clustered one by one in sequential. In such case, when there are M slave CPU cores and $1 \le M \le N/\tau$, the top $\log_R M+1$ levels are fully parallel due to small number of segments. For lower levels, each CPU core needs to deal with multiple local clustering tasks. As a result, the total clustering time is $$T_2 = O\left(R^{\gamma-1}\tau^2 \left[\log_R M + 1 + R + R^2 + \ldots + \frac{N}{\tau M}\right]\right) = \quad (8)$$

$$O\left(R^{\gamma-1}\tau^2 \left[\log_R M + \frac{\frac{N}{\tau M} R - 1}{R - 1}\right]\right).$$

We can set τ=kR so that the clustering at the top level only consists of one segment. With Eq. (7) and Eq. (8), we can write the run-time for all the sequential clustering tasks as Eq. (9).

$$T_{clt} = \begin{cases} O\left(R^{\gamma+1} k^2 \left[\log_R M + \frac{\frac{N}{kM} - 1}{R - 1}\right]\right), & \text{if } M < \frac{N}{kR}, \\ O\left(R^{\gamma+1} k^2 \log_R \frac{N}{k}\right), & \text{if } M \ge \frac{N}{kR}. \end{cases} \quad (9)$$

In addition to the clustering, the data segmentation at each level also takes time. A binary splitting process is adopted to generate the segments. At a certain level with N data points, about N'/τ segments are generated. The constrained D2-clustering algorithm for each splitting runs in a similar order of K-means because it avoids large linear programming in the centroid update stage. For the simplicity of analysis, we assume the splitting tree is balanced and constrained D2-clustering has a linear time complexity. The total time to complete the splitting at a certain level is O(N' log N'/τ) And the total time for data segmentation among all levels is $$T_{seg} = O\left(N\log\frac{N}{\tau} + \frac{N}{R}\log\frac{N}{R\tau} + \frac{N}{R^2}\log\frac{N}{R^2\tau} + \ldots + \frac{N}{R^{L-1}}\log\frac{N}{R^{L-1}\tau}\right) \quad (10)$$

$$= O\left(N\log\frac{N}{\tau}\left(1 + \frac{1}{R} + \ldots + \frac{1}{R^{L-1}}\right) - N\log R\left(\frac{1}{R} + \frac{2}{R^2} + \ldots + \frac{L-1}{R^{L-1}}\right)\right)$$

$$= O\left(\frac{R}{R-1}\left[N\log\frac{N}{\tau} - k\log\frac{k}{\tau} - \frac{N-k}{R-1}\log R\right]\right)$$

$$= O\left(\frac{R}{R-1}\left[N\log\frac{N}{\tau} - (N-k)\frac{R}{R-1}\log R\right]\right).$$

In summary, the run-time for the parallel D2-clustering algorithm is $T = T_{clt} + T_{seg}$.

To simplify the analysis below, we assume there are always sufficient CPU cores to ensure parallel computing, i.e., $M \ge N/kR$ Combining $T_{clt}$ and $T_{seg}$ by constant coefficients $C_1$ and $C_2$, we get $$T = O\left(C_1 R^{\gamma+1} k^2 \log_R \frac{N}{k} + C_2 \frac{R}{R-1}\left[N\log\frac{N}{k} - (N-k)\frac{R}{R-1}\log R\right]\right). \quad (11)$$

Evidently the leading order of the above run-time is O(N log N).

In fact, even if the number of CPU cores M=1, the algorithm's run-time is still faster than the original sequential D2-clustering because large linear programming problems in Eq. (3) are avoided. In Eq. (9) if M=1, $$T_{clt} = O\left(R^{\gamma+1} k^2 \frac{\frac{N}{k} - 1}{R - 1}\right),$$

which is linear to N.

From Eq. (11), we can also imply the value of the shrinking parameter R in the algorithm's hierarchy. Define $$C_4 = k^2 \log\frac{N}{k}, \quad C_5 = N\log\frac{N}{k},$$

and $C_4$=N−k. We rewrite Eq. (11) as $$T = C_1 C_4 \frac{R^{\gamma+1}}{\log R} + C_2 \frac{R}{R-1}\left[C_5 - C_6 \frac{R\log R}{R-1}\right].$$

Then we take the derivative of T over R.

$$\frac{dT}{dR} = C_1 C_4 \frac{R^\gamma[(\gamma+1)\log R - 1]}{(\log R)^2} + C_2 \frac{C_5 - C_6 R}{(R-1)^2}.$$

There is no analytical solution of the equation $$\frac{dT}{dR} = 0.$$

In order to plot the curve of $$\frac{dT}{dR},$$

we use N=1000 and k=10 which are typical values in our experiment to get $C_4$, $C_5$, and $C_6$. Because the data segmentation involves a constrained D2-clustering within each binary split, the constant multiplier $C_2$ is higher $C_1$. Without loss of generality, we set $\gamma=3$, $C_1=1$ and $C_2=100$.

Figure 4B:
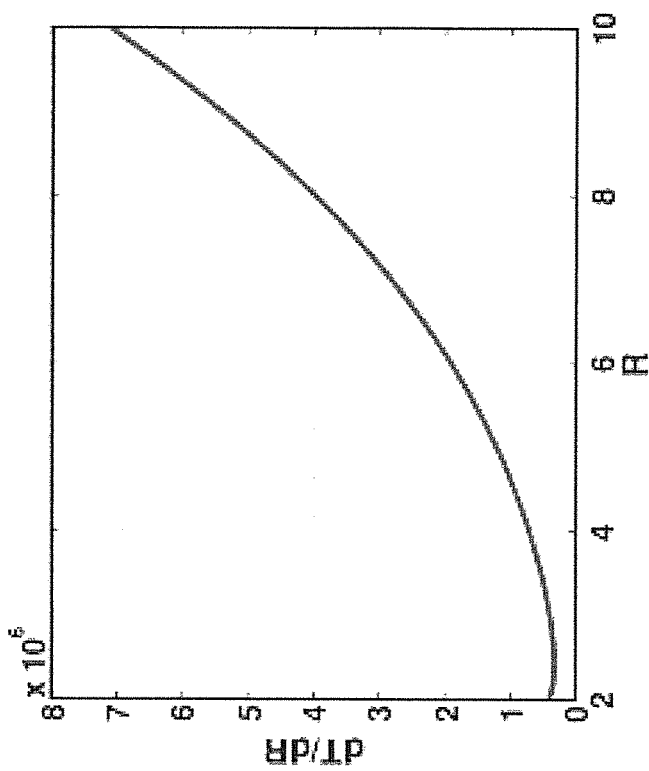
FIG. 4B shows the relationship between the run-time T (number of CPU cycles) and the shrinking factor R, wherein the derivative of T over R.
Figure 4A:
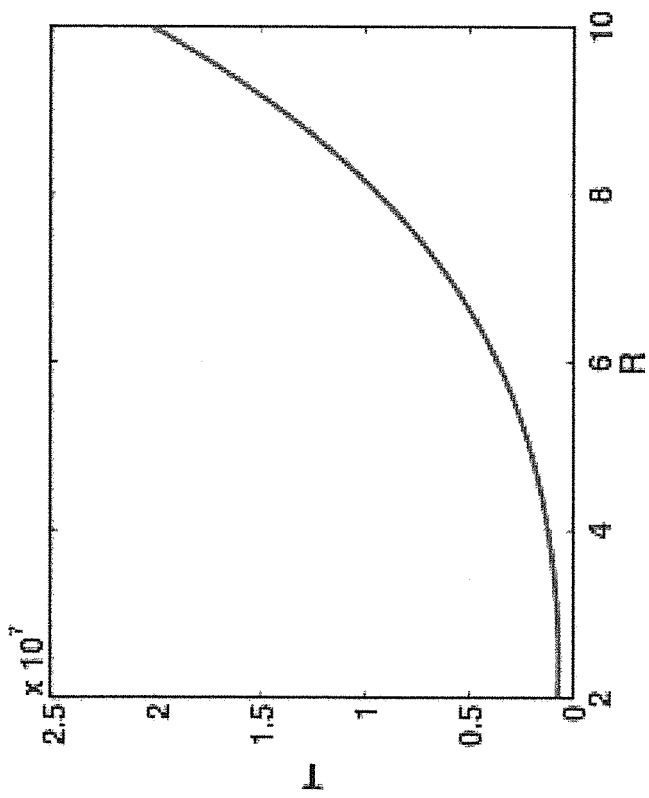
FIG. 4A shows the relationship between the run-time T (number of CPU cycles) and the shrinking factor R, wherein T is an increasing function of R.

FIGS. 4A and 4B shows the trend of T and $$\frac{dT}{dR}$$

with different values of R. In general the run-time T of the parallel D2-clustering is an increasing function of R. So a small R is favorable in terms of run-time. On the other hand, however, small R tends to create lots of parallel segments at each level of the hierarchy, and make the hierarchy with too many levels, which eventually increases the approximation error. In our implementation we set R=5, which is a moderate value that guarantees both the fast convergence of the algorithm and compactness of the hierarchical structure.

Experiments

To validate the advantage and usefulness of this algorithm, we conduct experiments on four different types of dataset: images, videos, protein sequences, and synthetic data. Though our work was originally motivated by image concept learning, we apply the parallel D2-clustering algorithm to different scenarios. Readers in these or other areas may find applications that are suitable to embed the algorithm into.

Images:

First, we test the algorithm on images crawled from Flickr in several experiments. When crawling images from Flickr, we use the Flickr API to perform keyword query for certain concepts, and download top N images with highest values of interestingness. The number of images N is different in different experiments. Typically it is at a scale of thousands, much larger than the scale the sequential D2-clustering has been applied. If such clustering is performed for multiple concepts, the training dataset for image tagging can easily reach several millions, which is quite large for image annotation.

For such image datasets, each image is first segmented into two sets of regions based on the color (LUV components) and texture features (Daubechies-4 wavelet (Daubechies, 1992) coefficients), respectively. We then use two bags of weighted vectors U and V, one for color and the other for texture, to describe an image as I=(u,v). The distance between two images, $I_i=(u_i,v_i)$ and $I_j=(u_j,v_j)$, is defined as $$\hat{D}(I_i,I_j) = (D^2(u_i,u_j) + D^2(v_i,v_j))^{1/2} \quad (12)$$

where D(•,•) is the Mallows distance. It is straightforward to extend the D2-clustering algorithm to the case of multiple discrete distributions using the combined distance defined in Eq. (12). Details are provided in (Li and Wang, 2008). The order of time complexity increases simply by a multiplicative factor equal to the number of distribution types, the so-called super-dimension.

To demonstrate the applicability of D2-clustering in real-world applications, we also apply the algorithm to a large-scale Flickr dataset for image concept learning, and evaluate the effectiveness of the clustering by the performance of the concept learning system.

Videos:

Second, we adopt videos queried and downloaded from Youtube. We represent each video by a bag of weighted vectors, and conduct parallel D2-clustering on these videos. Then we check the accordance between the clustering result and the videos' genre.

For the video clustering, we adopt the features used in (Yanagawa et al., 2007). Edge Direction Histogram (EDH), Gabor (GBR), and Grid Color Moment (GCM) features are extracted from each frame. A video is segmented into several sub-clips based on the continuity of these three features among nearby frames (Lienhart, 1999). Using the time percentage of each sub-clip as the weight of its average feature vector, we represent the video by a bag of weighted vectors by combining all sub-clips.

Protein Sequences:

Third, we download the SwissProt protein data (Boeckmann et al., 2003) provides the class labels of these protein sequences. Using the Prosite data, we can select protein sequences from several certain classes as the experiment dataset, which contains data gathering around some patterns. Each protein sequence is composed of 20 types of amino acids. We count the frequency of each amino acid in a sequence, and use the frequency as the signature of the sequence.

Synthetic Data:

The parallel program is deployed on a computation cluster at The Pennsylvania State University named "CyberStar" consisting of 512 quad-core CPUs and hence a total of 2048 computation units. These Intel Nehalem processors run at 2.66 GHz. Because M=2048, theoretically it can be guaranteed that at each level every data segment can be processed in parallel by a unique CPU core when the data size is several thousands. In practice the system puts a limit to the maximal number of processors each user can occupy at a time because it is a publicly shared server.

In this section, we first evaluate objectively the D2-clustering algorithm on image datasets with different topics and scales. Then we show the D2-clustering results for the image, video, protein, and synthetic datasets, respectively.

Comparison with Sequential Clustering

In order to compare the clustering results of the parallel and sequential D2-clustering, we have to run the experiment on relatively small datasets so that the sequential D2-clustering can finish in a reasonable time. In this experiment, 80 concepts of images, each including 100 images downloaded from Flickr, are clustered individually using both approaches. We compare the clustering results obtained for every concept.

It is in general challenging to compare a pair of clustering results, as shown by some sincere efforts devoted to this problem (Zhou et al., 2005). The difficulty comes from the need to match clusters in one result with those in another. There is usually no obvious way of matching. The matter is further complicated when the numbers of clusters are different. The parallel and sequential clustering algorithms have different initializations and work flows. Clearly we cannot match clusters based on a common starting point given by initialization. Moreover, the image signatures do not fall into highly distinct groups, causing large variation in clustering results.

We compare the clustering results by three measures.

Within-Cluster Dispersion:

First, we assess the quality of clustering by the generally accepted criterion of achieving small within-cluster dispersion, specifically, the mean squared distance between a data entry and its corresponding centroid.

Centroid-Based Difference:

Second, we define a distance between two sets of centroids. Let the first set of centroids be $Z=\{z_1, \ldots, z_k\}$ and the second set be $Z'=\{z'_1, \ldots, z'_{k'}\}$. A centroid $z_i$ (or $z'_i$) is associated with a percentage $p_i$ (or $p_i'$) computed as the proportion of data entries assigned to the cluster of $z_i$ (or $z'_i$). We define a Mallows-type distance $\tilde{D}(Z,Z')$ based on the element-wise distances $D(z_i,z_j')$, where $d(z_i,z_j')$ is the Mallows distance between two centroids, which are both discrete distributions. We call $\tilde{D}(Z,Z')$ Mallows-type because it is also the square root of a weighted sum of squared distances between the elements in $Z$ and $Z'$. The weights satisfy the same set of constraints as those in the optimization problem for computing the Mallows distance.

$$\tilde{D}^2(Z,Z')=\Sigma_{i=1}^{k}\Sigma_{j=1}^{k'}\omega_{i,j}D^2(z_i,z_j') \quad (13)$$

subject to: $\Sigma_{j=1}^{k'}\omega_{i,j}=p_i$, $\Sigma_{i=1}^{k}\omega_{i,j}=p'_j$, $\omega_{i,j}\geq 0$, $i=1, \ldots, k$, $j=1, \ldots, k'$.

We refer to $\tilde{D}(Z,Z')$ as the MM distance (Mallows-type weighted sum of the squared Mallows distances).

Categorical Clustering Distance:

Third, we use a measure for two ways of partitioning a dataset, which is proposed by Zhou et al. (2005). This measure only depends on the grouping of data entries and is irrelevant with centroids. We refer to it as the categorical clustering distance. Let the first set of clusters be $P=\{P_1, P_2, \ldots, P_k\}$ and the second be $P'=\{P'_1, P'_2, \ldots, P'_{k'}\}$. Then the element-wise distance $D_p(P_i,P'_j)$ is the number of data entries that belong to either $P_i$ or $P'_j$, but not the other. The distance between the partitions $\tilde{D}_p(P,P')=\Sigma_{i=1}^{k}\Sigma_{j=1}^{k'}\omega_{i,j}D_p(P_i,P'_j)$ is again a Mallows-type weighted sum of $D_p(P_i,P'_j)$, $i=1, \ldots, k$, $j=1, \ldots, k'$. Details can be found in (Zhou et al., 2005).

Figure 5A:
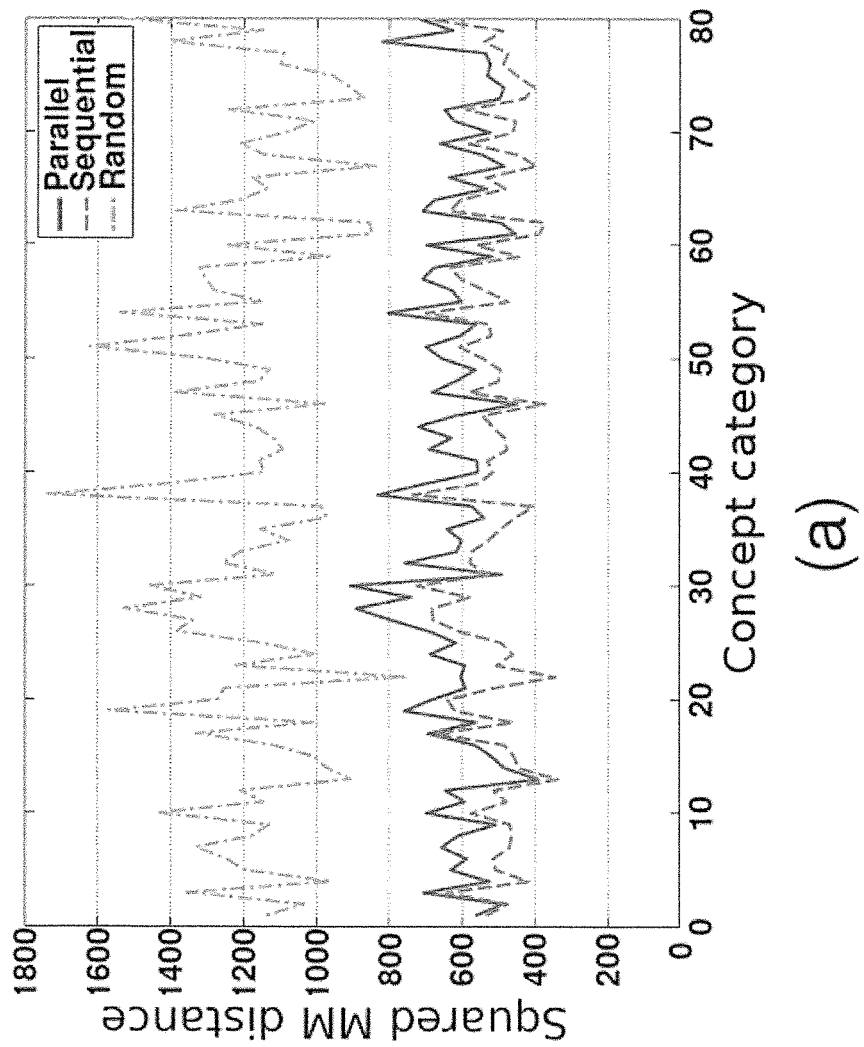
FIG. 5A is a plot of mean-squared distances.

For each concept category, the number of clusters is set to 10. The mean squared distance from an image signature to its closest centroid is computed based on the clustering result obtained by the parallel or sequential D2-clustering algorithm. These mean squared distances are plotted in FIG. 5A. We also compute the mean squared distance using randomly generated clusters for each concept. The random clustering is conducted 10 times and the average of the mean squared distances is recorded as a baseline. The random clusters, unsurprisingly, have the largest mean squared distances. In comparison, the parallel and sequential algorithms obtain close values for the mean squared distances for most concepts. Typically the mean squared distance by the parallel clustering is slightly larger than that by the sequential clustering. This shows that the parallel clustering algorithm compromises the tightness of clusters slightly for speed.

Figure 5B:
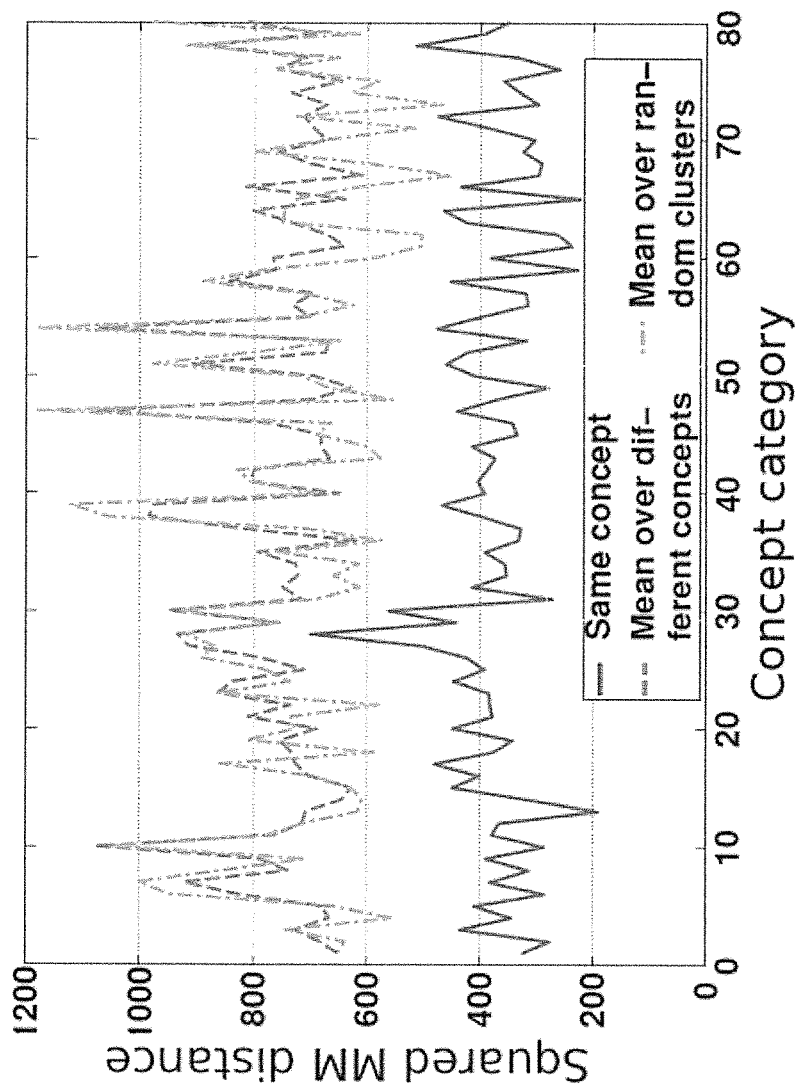
FIG. 5B compares the clustering results using the MM distance between sets of centroids acquired by different methods.

FIG. 5B compares the clustering results using the MM distance between sets of centroids acquired by different methods. For each concept i, the parallel algorithm generates a set of centroids $Z_i=\{z_1, \ldots, z_k\}$ and the sequential algorithm generates a set of centroids $Z'_i=\{z'_1, \ldots, z'_{k'}\}$. The solid curve in FIG. 5B plots $\tilde{D}^2(Z_i,Z'_i)$ for each concept i. To demonstrate that $\tilde{D}(Z_i,Z'_i)$ is relatively small, we also compute $\tilde{D}(Z_i,Z'_j)$ for all pairs of concepts $i \neq j$. Let the average $$d_i^2 = \frac{1}{c-1}\sum_{j=1, j\neq i}^{c}\tilde{D}^2(Z_i, Z'_j),$$

where c=80 is the number of concepts. We use $d_i^2$ as a baseline for comparison and plot it by the dashed line in the figure. For all the concepts, $d_i$ is substantially larger than $\tilde{D}(Z_i,Z'_j)$, which indicates that the set of centroids $Z_i$ derived from the parallel clustering is relatively close to $Z'_i$ from the sequential clustering. Another baseline for comparison is formed using random partitions. For each concept i, we create 10 sets of random clusters, and compute the average over the squared MM distances between $Z_i$ and every randomly generated clustering. Denote the average by $\tilde{d}_i^2$, shown by the dashed dot line in the figure. Again comparing with $\tilde{d}_i^2$, the MM distances between $Z_i$ and $Z'_i$ are relatively small for all concepts i.

Figure 5C:
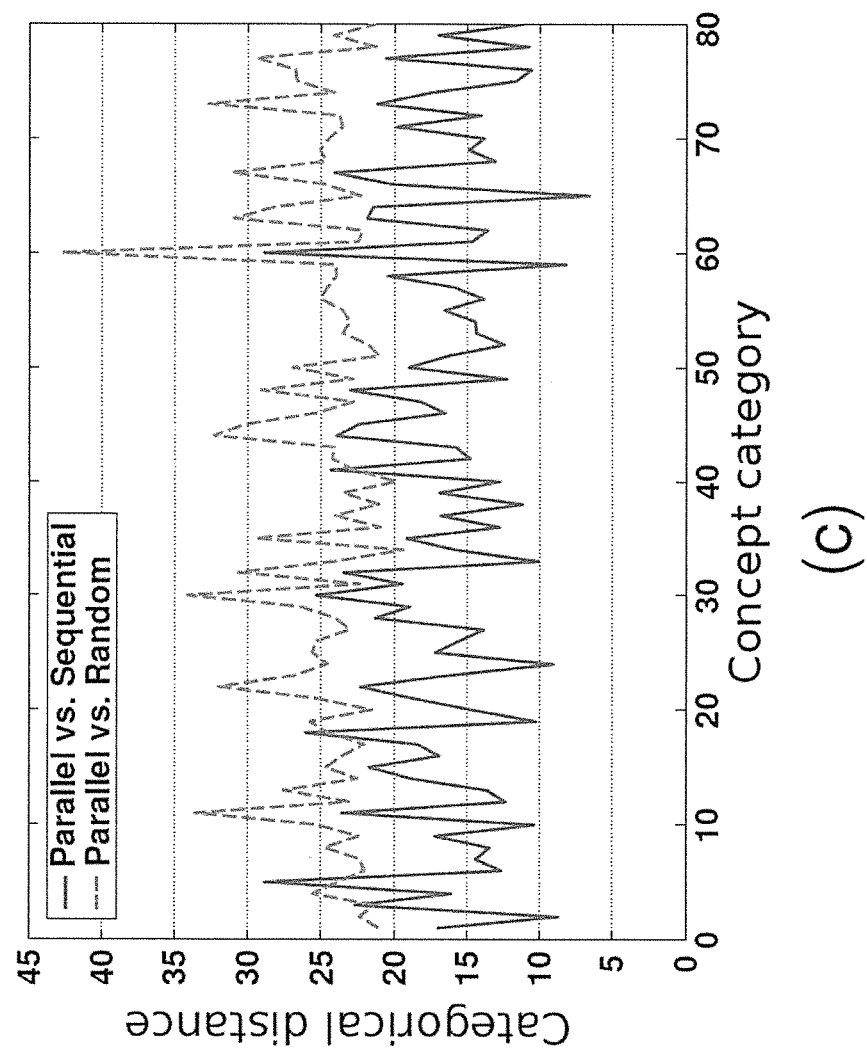
FIG. 5C plots the categorical clustering distance between the parallel and sequential clustering results for every image concept.

FIG. 5C plots the categorical clustering distance defined by Zhou et al. (2005) between the parallel and sequential clustering results for every image concept. Again, we compute the categorical clustering distance between the result from the parallel clustering and each of 10 random partitions. The average distance is shown by the dash line in the figure. For most concepts, the clustering results from the two algorithms are closer than those from the parallel algorithm and random partition. However, for many concepts, the categorical clustering distance indicates substantial difference between the results of the parallel and sequential algorithm. This may be caused to a large extent by the lack of distinct groups of images within a concept. In summary, based on all the three measures, the clustering results by the parallel and sequential algorithms are relatively close.

Scalability Property

The parallel D2-clustering runs in approximately linearithmic time, while the sequential algorithm scales up poorly due to its polynomial time complexity. In order to demonstrate this, we perform clustering on sets of images with different sizes using both the parallel and sequential D2-clustering with different conditions, and examine the time consumed.

Figure 6:
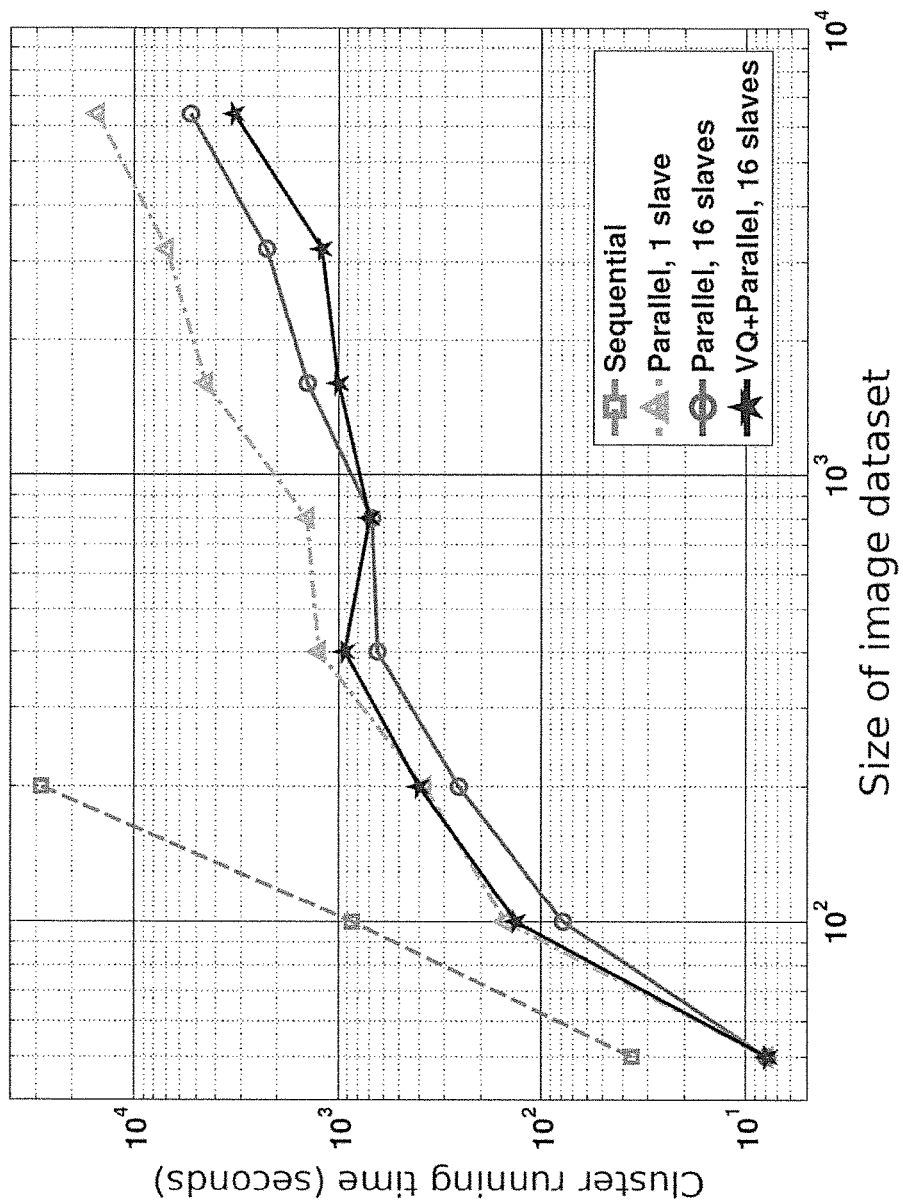
FIG. 6 shows how the parallel algorithm scales up approximately at linearithmic rate.

FIG. 6 shows the running time on sets of images in the concept "mountain". In the plot, both axes are in logarithmic scales. All versions of clusterings are performed on datasets with sizes 50, 100, 200, 400, 800, 1600, 3200, and 6400. We test the parallel D2-clustering algorithm in three cases with identical parameters τ=50 and e=5. In the first case, there is only one slave CPU handling all the clustering requests sent by the master CPU (i.e. there are two CPUs employed in total). All clustering requests are therefore processed sequentially by the only slave processor. In the second case, there are 16 slave CPUs (i.e. 17 CPUs in total). In the third case, the conditions are the same to the second case, but the data segmentation is implemented by a Vector Quantization (VQ) (Gersho and Gray, 1992) approach instead of the approach described earlier. For comparison, the original sequential D2-clustering algorithm is also tested on the same datasets.

FIG. 6 shows the parallel algorithm scales up approximately at linearithmic rate. On a log-log plot, this means the slope of the curve is close to 1. The number of slave CPUs for the parallel processing contributes a linear difference (the second term in Eq. (7)) to the run-time between the first and second parallel cases. When N is small, the linear difference may be relatively significant and make the single CPU case much slower than the multiple CPU case. But the difference becomes less so when the dataset is large because there is a dominant linearithmic term in the run-time expression. Nevertheless, in either case, the parallel algorithm is much faster than the sequential algorithm. The slope of the curve on the log-log plot for the sequential algorithm is much larger than 1, indicating at least polynomial complexity with a high degree. As a matter of fact, the parallel algorithm with 16 slave CPUs takes 88 minutes to complete clustering on the dataset containing 6400 images, in contrast to almost 8 hours consumed by the sequential algorithm running only on the dataset of size 200. Because the time for the sequential D2-clustering grows dramatically with the data size, we can hardly test it on dataset larger than 200.

For the last parallel case, we include VQ in the segmentation in order to further accelerate the algorithm. Based on the analysis above, we know that data segmentation takes a lot of time at each level of the algorithm. In the VQ approach, we quantify the bag of weighted vectors to histograms and treat them as vectors. These histograms are then segmented by K-means algorithm in the segmentation step. The clustering within each segment is still D2-clustering on the original data. However the time spent for segmentation is much shorter than the original approach. In FIG. 6 the acceleration is reflected by the difference between the run-time curves of parallel D2-clustering with and without VQ segmentation when N is large. When N is small and the data segmentation is not dominant in the run-time, VQ will usually not make the clustering faster. In fact due to bad segmentation of such a coarse algorithm, the time consumed for D2-clustering within each segment might be longer. That is the reason why the parallel D2-clustering with VQ segmentation is slower than its counterpart without VQ segmentation (both have same parameters and 16 slave CPUs employed) in FIG. 6 when N is smaller than 800.

Theoretically VQ can reduce the order of the clustering from linearithmic to linear (because in $T_{seg}$ Eq. (10) is reduced to a linear order). However because the quantization step loses some information, the clustering result might be less accurate. This can be reflected by the MM distance (defined in Eq. (13)) between the parallel D2-clustering with VQ segmentation and the sequential D2-clustering results on a dataset containing 200 images, which is 19.57 on average for five runs. Compared to 18.41 as the average MM distance between the original parallel D2-clustering and sequential D2-clustering results, the VQ approach makes the parallel clustering result less similar to the sequential clustering result which is regarded as the standard.

No matter whether VQ is adopted, the experiment shows the acceleration of parallel D2-clustering over the sequential algorithm, which verifies the run-time analysis. Applying the algorithm, we can greatly increase the scale of discrete distribution clustering problems.

Visualization of Image Clustering

Simulating the real image annotation application, the parallel D2-clustering algorithm is applied to a set of 1,488 images downloaded from Flickr (τ=5Q, e=5). These images are retrieved by query keyword "mountain". For such a set, we do not have ground truth for the clustering result, and the sequential D2-clustering cannot be compared because of its unrealistic running time. We thus visualize directly the clustering result and attempt for subjective assessment.

Figure 7:
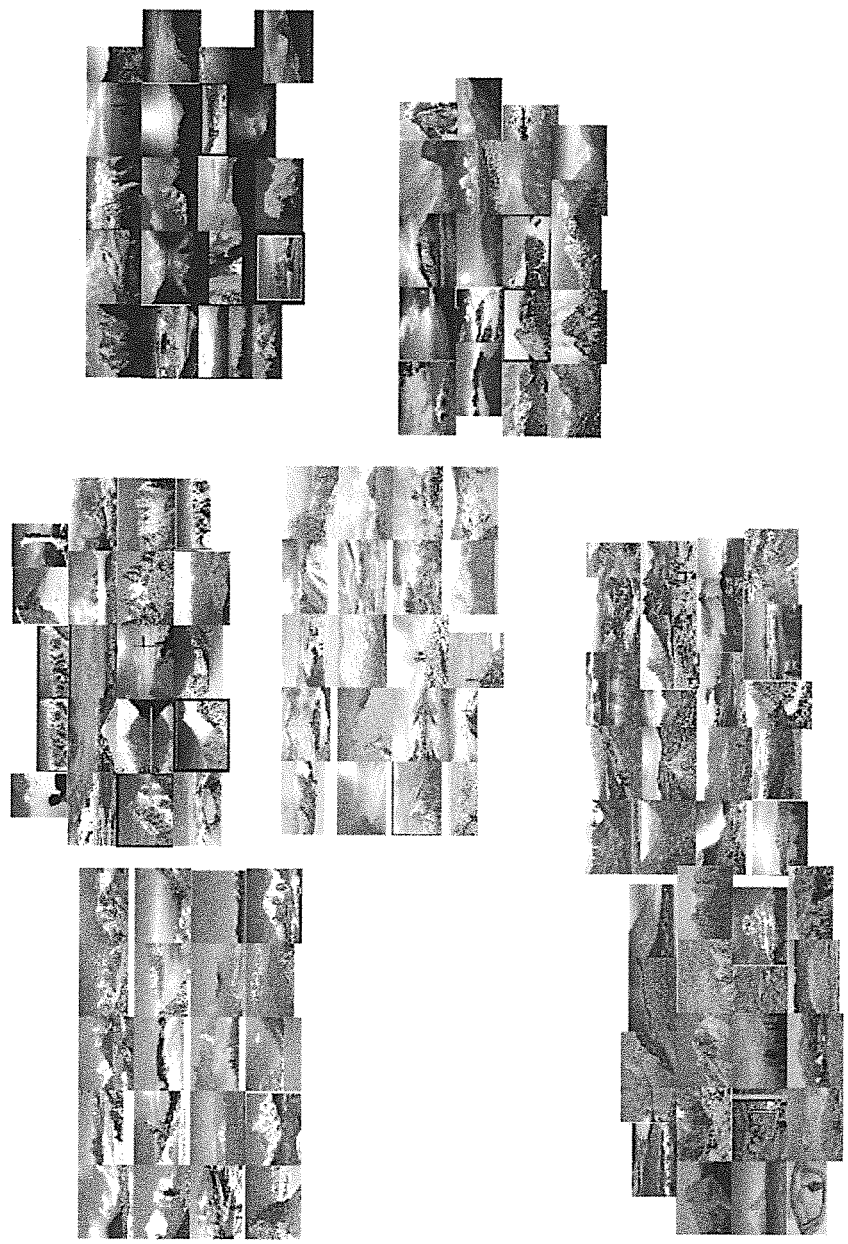
FIG. 7 shows how images with similar color and texture are put in the same clusters.
Figure 8B:
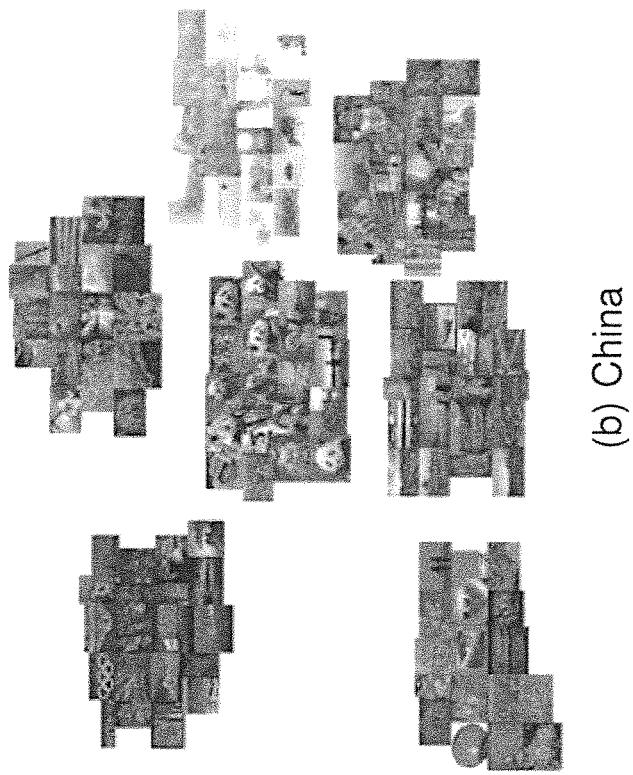
FIGS. 8A-8D provide more clustering results for images with different concepts.
Figure 8A:
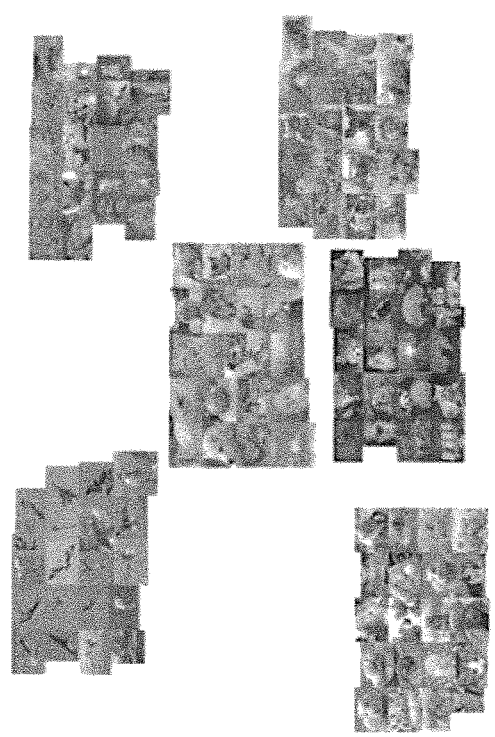
Figure 8D:
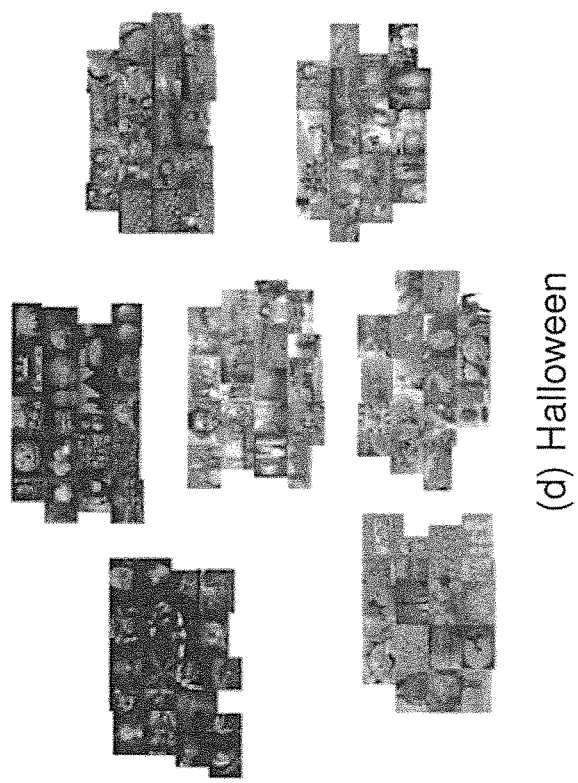
Figure 8C:
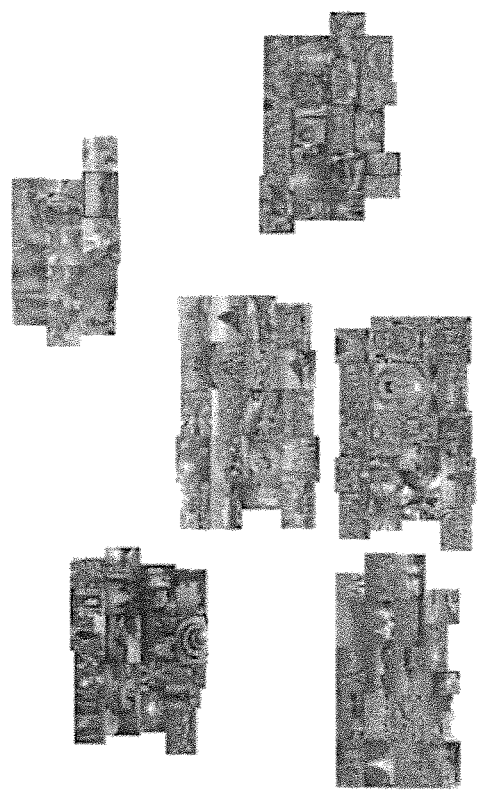

The 1,488 images are clustered into 13 groups by the parallel D2-clustering algorithm using 873 seconds (with 30 slave CPUs). At the end, there are 7 clusters with sizes larger than 100, for each of which 20 images closest to the corresponding cluster centroid are displayed in groups in FIG. 7. In the figure we try to manually arrange similar clusters close, and dissimilar ones far away based on the Mallows distances between the cluster centroids. FIG. 7 shows that images with similar color and texture are put in the same clusters. More clustering results for images with different concepts are shown in FIGS. 8A-8D. For all the datasets, visually similar images are grouped into the same clusters. The parallel algorithm has produced meaningful results.

Image Concept Modeling by the Clustering Results

The D2-clustering result can be used for image concept modeling as introduced in ALIPR (Li and Wang, 2008). For images within each concept, we perform a D2-clustering. We then use the clustering result to build a Gaussian Mixture Model (GMM) for the concept by fitting each cluster to a Gaussian component in the GMM.

Because both the image descriptors and the cluster centroids are discrete distributions rather than vectors, we are not able to directly fit a Gaussian component by estimating a covariance matrix which is the second order statistics between every two dimensions in the Euclidean space. Instead, we use the Hypothetical Local Mapping (HLM) to map these discrete distributions to a probability space where they follow a Gaussian distribution. If the squared distances from data points in a cluster to the centroid follow a Gamma distribution Gamma($d/2, 2\sigma^2$) with pdf $$f(u) = \frac{\left(\frac{u}{2\sigma^2}\right)^{\frac{d}{2}-1} e^{-\frac{u}{2\sigma^2}}}{2\sigma^2 \Gamma\left(\frac{d}{2}\right)},$$

the data points on the hypothetical space follow a multivariate Gaussian distribution $N(z, \sigma^2 I_d)$ with $$pdf \ f(x) = \left(\frac{1}{\sqrt{2\pi\sigma^2}}\right)^d e^{-\frac{u}{2\sigma^2}},$$

where $u = \tilde{D}^2(x, z)$ is the squared distance from a data point x to the corresponding centroid z. The percentage size of a cluster is used as the weight for the component. As a result, we estimate the image concept model for concept ψ as $f_\psi(x) = \sum_{i=1}^{k} \xi_i f_\psi^i(x)$, where $\xi_i$ is the percentage size for the i-th cluster with Gaussian distribution $f_\psi^i(x)$ estimated by HLM.

With the parallel algorithm, we can run the clustering on much larger datasets than ALIPR did, and hence build concept models covering broader aspects of each concept. When a query image comes, we apply the Bayesian's law to estimate the posterior probability it belongs to each concept, and eventually generate annotations.

We crawled images from Flickr for this experiment. For each of the 144 most popular tags on Flickr, top 1,000 images ranked by interestingness are downloaded as the training data for concept learning. After performing parallel D2-clustering on each concept set, we used HLM to build a GMM for the concept. As a comparison, we also use the original sequential D2-clustering algorithm to build the concept models. Due to the incapability of the sequential algorithm running on large dataset, the sequential clustering is only applied on the top 100 most interesting images for each concept.

The testing images are also crawled by keyword query, but ranked by uploading date in descending order. They are crawled several months after the downloading of the training set. Therefore, the testing set is guaranteed to be different to the training set. Because the user-generated tags on Flickr are noisy, there are many irrelevant images in each concept set. In addition, for certain abstract concepts, such as "day" and "travel", in which no apparent objects and visual patterns exists, it is difficult even for human to judge whether an image is relevant to the concept without any non-visual context. Therefore we handpicked the testing images and only kept images with visual features confidently related to the corresponding query, which is regarded as the ground-truth labels. At last we build an testing set containing 3,325 images from 75 concepts.

We compute and rank the posterior probability of a testing image belonging to every concept model trained by the clustering result. If the ground-truth label of the image gets a high posterior probability, the result is meaningful for annotation. We regard the result relevant if the top five predicted concepts contain the ground-truth label. Using the concept models obtained by the parallel D2-clustering results, 1111 testing images (33.4%) get relevant concept predictions. Whereas by the models from the sequential clustering, only 875 testing images (26.3%) are correctly tagged.

FIG. 9 presents some examples of the concept prediction experiment. Because the training data are small and noisy for the sequential D2-clustering algorithm, the concept models obtained by its clustering results do not well depict the probabilistic distribution of the visual descriptors, and hence fail to generate accurate predictions. The concept prediction by the models from parallel D2-clustering's results have a better performance. Usually the top predicted concepts are more relevant than those from the sequential models, even though sometimes the user-generated labels on Flickr are noisy. For instance, for the third image, it is crawled as an image with the concept "summer" from Flickr. The models obtained from the parallel clustering results successfully categorize the image to some more relevant concepts.

The advantage of the non-parametric concept modeling approach is that it can well depict the probabilistic distribution of every concept on the feature space, at the same time be robust to noise. The number of training data is crucial to the estimation of the model. More training data covering more variants of a concept can help us better build the model. Therefore the models obtained by the parallel D2-clustering algorithm which runs on a larger dataset outperform the models built from the small dataset by sequential clustering. Additionally, we can observe that in the large training dataset, the images are noisy data directly crawled from Flickr, but the concept models can still get satisfactory performance for image annotation, which demonstrates the robustness of the approach. In practice it is still preferable to get clean data for training, where the tag refinement technique (Sawant et al., 2013) can be adopted to remove some (though not all) of the noise and hence further enhance the system performance. In conclusion, the parallel D2-clustering algorithm is practical in real-world image annotation applications, where training images within every single concept are variant in visual appearances, large in size, and noisy in user-generated tags.

Video Clustering

To demonstrate the application of parallel D2-clustering on video clustering, we download 450 videos from Youtube. They are all 5 to 20 minutes in length, and come from 6 different queries, which are "news", "soccer", "lecture", "movie trailer", "weather forecast", and "tablet computer review". Each category contains 75 videos. We compare the clustering result with the category label to check the correctness of the algorithm.

It should be emphasized that video classification is a complicated problem. Since our algorithm is an unsupervised clustering algorithm rather than a classification method, we cannot expect it to classify the videos with a high accuracy. In addition, though not the major concern in this paper, the visual features for segmenting and describing videos are crucial for the accuracy of the algorithm. Here we only adopt some easy-to-implement simple features for demonstration. Therefore the purpose of this experiment is not to pursue the best video classification, but to demonstrate the reasonable results of the parallel D2-clustering algorithm on videos. The videos' class labels, which serve as the ground truth, are used as a reference to show whether similar videos can be clustered into a same group.

In this experiment, we set $\tau=30$, $e=5$, and request 15 slave CPUs (M=15) to cluster the data. As mentioned above, we adopt three visual features, EDH, GBR, and GCD, to segment and describe each video. We extract the features and form the video descriptors before the clustering. Typically a video will be segmented into 10 to 30 sub-clips, depending on its content and length. In addition, the feature vector itself is high in dimension (73 for EDH, 48 for GBR, and 225 for GCD). As a result, each video is represented by a large bag of weighted vectors.

By applying the parallel D2-clustering algorithm, we can get a clustering result for this high dimensional problem in 847 seconds. 6 major clusters (C1-C6) are generated and Table II is the confusion table. We then try to use the clustering result for classification by assigning each cluster with the label corresponding to its majority class. For these six clusters, the unsupervised clustering achieves a classification accuracy of 47.5%.

TABLE II

Video clustering result by parallel D2-clustering.

| | Cluster (Size) | | | | | |
|---|---|---|---|---|---|---|
| | C1 (81) | C2 (36) | C3 (111) | C4 (40) | C5 (72) | C6 (75) |
| Soccer | 43 | 5 | 1 | 1 | 8 | 10 |
| Tablet | 19 | 23 | 14 | 1 | 9 | 4 |
| News | 9 | 3 | 27 | 6 | 17 | 5 |
| Weather | 4 | 0 | 31 | 32 | 1 | 0 |
| Lecture | 4 | 2 | 32 | 0 | 17 | 13 |
| Trailer | 2 | 3 | 6 | 0 | 20 | 43 |

Protein Sequence Clustering

Sequence clustering is a basic problem in bioinformatics. The protein or DNA sequences are normally huge in number and complex in distance measures. It is a trending topic on how to develop fast and efficient biological sequence clustering approaches on different metrics, e.g. (Voevodski et al., 2012; Huang et al., 2010). Composition-based methods for sequence clustering and classification, either DNA (Kelley and Salzberg, 2010; Kislyuk et al., 2009) or protein (Garrow et al., 2005), use the frequencies of different compositions in each sequence as the signature. Nucleotides and amino acids are basic components of DNA and protein sequence respectively and these methods use a nucleotide or amino acid histogram to describe a sequence.

Because different nucleotide or amino acid pairs have different similarities determined by their molecular structures and evolutionary relationships, cross-term relations should be considered when we compute the distance between two such histograms. As a result, the Mallows distance would be a proper metric in composition-based approaches. However, due to the lack of effective clustering algorithms under the Mallows distance, most existing clustering approaches either ignore the relationships between the components in the histograms and treat them as variables in a vector, or perform clustering on some feature vectors derived from the histograms. In this case, D2-clustering will be especially appealing. Considering the high dimensionality and large scale of biological data, parallel algorithm is necessary.

In this experiment, we perform parallel D2-clustering on 1,500 protein sequences from Swiss-Prot database, which contains 519,348 proteins in total. The 1,500 proteins are selected based on Prosite data, which provides class labeling for part of Swiss-Prot database. We randomly choose three classes from Prosite data, and extract 500 protein sequences from Swiss-Prot database for each class to build our experiment dataset.

Each protein sequence is transformed to a histogram of amino acid frequencies. There is a slight modification in the computation of the Mallows distance between two such histograms over the 20 amino acids. In Eq. (1), the squared Euclidean distance between two support vectors is replaced by a pair-wise amino acid distance provided in the PAM250 mutation matrix (Pevsner, 2003). Given any two amino acids A and B, we can get the probabilities of A mutated to B and B mutated to A from the matrix. The distance between A and B is defined as $$D_{PAM250}(A \cdot B) = \log(P(A|B) + P(B|A)).$$

Figure 10A:
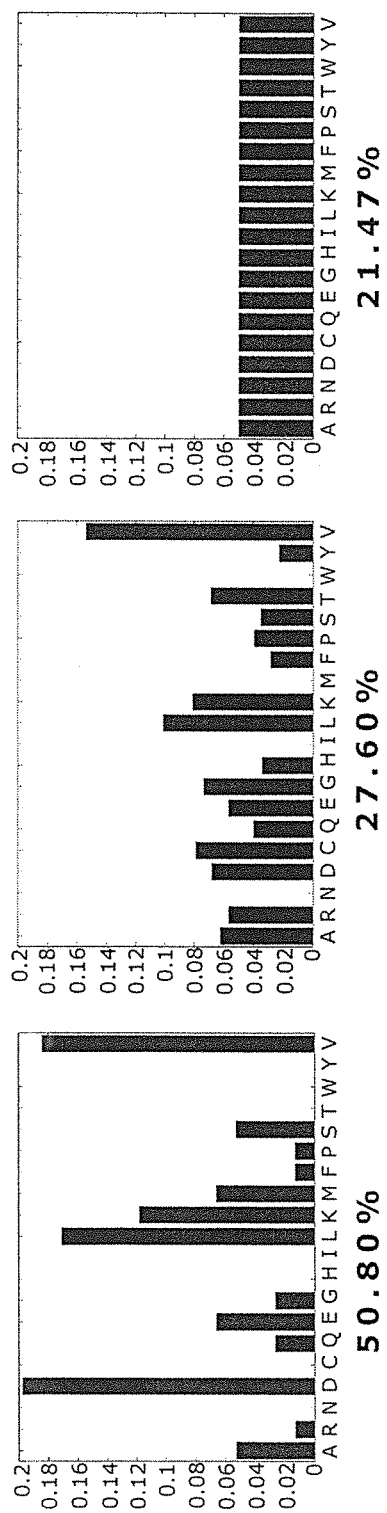
FIG. 10A describes clustering centroids.

Because the support vectors for each descriptor are the 20 types of amino acids and hence symbolic, we will skip the step to update support vectors in the centroid update of D2-clustering (refer to Step 2 in Algorithm 1) in the implementation of the parallel D2-clustering algorithm in this case. We set τ=30, e=5, and request 7 slave processors to perform the parallel clustering=7). We let the program generate 5 clusters and the clustering finishes in about 7 hours. Considering the high dimensionality of the histograms and the scale of the dataset, this is a reasonable time. Three out of the five clusters are major ones, which contain more than 99% of the dataset. FIG. 10A describes the clustering centroids.

If we do not consider cross-term differences in the distance between two histograms and use Euclidean distance as the metric, the clustering is reduced to K-means. Therefore in this application, we are able to apply K-means on the dataset. Running on the multi-CPU server, the K-means algorithm is also implemented by parallel programs. We parallelize K-means in two different ways. In the first one, we apply the approach suggested by Kantabutra and Couch (2000), which is to perform centroid update and label update in parallel for different segments of data and then combine partial result linearly. In this way the parallelization is equivalent to the original K-means on the whole dataset. In the second way, we adopt the same hierarchical clustering structure, as in FIG. 1, used in the parallel D2-clustering algorithm and only replace the Mallows distance by the Euclidean distance. Thus within each data segment at any level of the hierarchy, the locally performed clustering is K-means. However there will be some loss of accuracy since several data are grouped and treated as one object at higher levels' clustering, and will never be separated thereafter. For short, we refer to the first implementation as parallel K-means and the second one as hierarchical K-means.

Figure 10B:
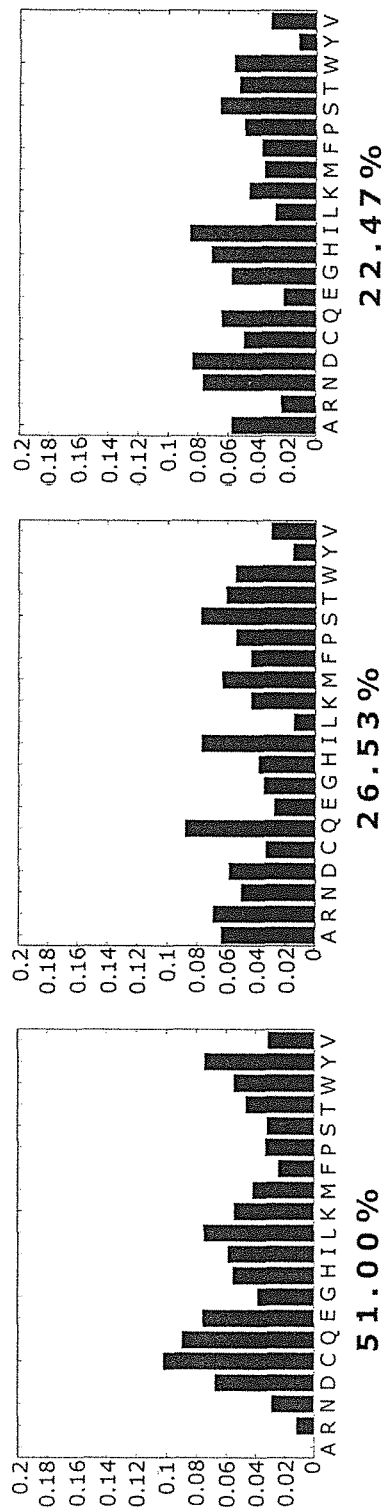
FIG. 10B and FIG. 10C show the clustering centroids generated by parallel K-means and hierarchical K-means, running on the same dataset with identical parameters.
Figure 10C:
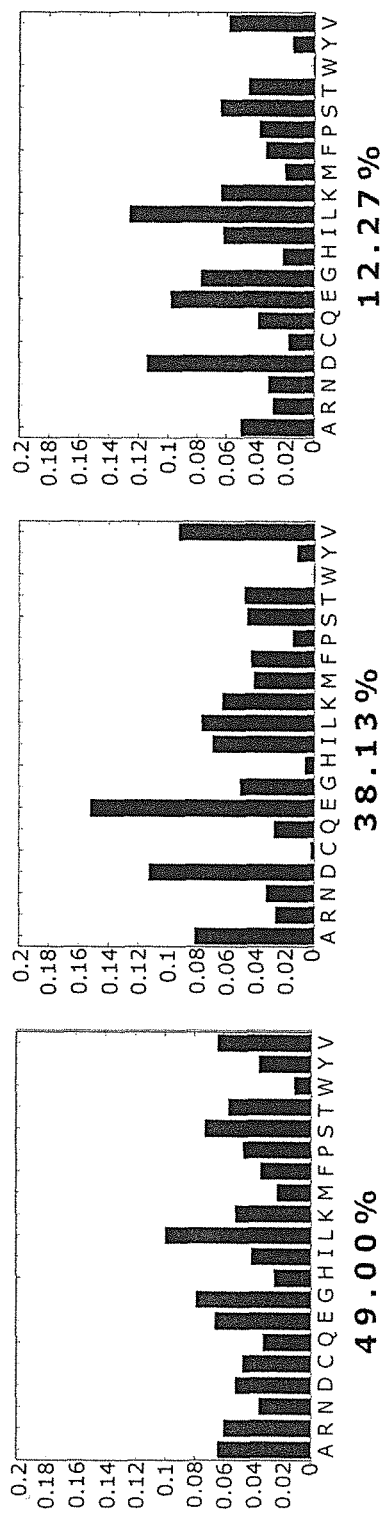

FIGS. 10B and 10C show the clustering centroids generated by parallel K-means and hierarchical K-means, running on the same dataset with identical parameters. Apparently, none of parallel K-means' or hierarchical K-means' centroids reveals distinct patterns compared with the centroids acquired by parallel D2-clustering. In order to prove the fact objectively, we compute the Davies-Bouldin index (DBI) [7] for all the three clustering results as the measurement of their tightness. DBI is defined as $$DB = \frac{1}{k}\sum_{j=1}^{k} \max_{l \neq j}\left(\frac{\sigma_j + \sigma_1}{d(z_j, z_1)}\right), \quad (14)$$

where k, is the number of clusters, $z_j$ is the centroid of cluster j, $d(z_j, z_1)$ is the distance from $z_j$ to $z_1$, and $\sigma_j$ is the average distance from $z_j$ to all the elements in cluster DBI is the average ratio of intra-cluster dispersion to inter-cluster dispersion. Lower DBI means a better clustering result with tighter clusters.

We compute DBI using both the squared Mallows distance and the squared Euclidean distance as d(•) in Eq. (14) for each clustering result. Table III shows the result. Parallel D2-clustering gains the lowest DBI in both cases. This indicates good tightness of the clusters generated by parallel D2-clustering. In contrast, the two implementations of K-means generate looser clusters than parallel D2-clustering. Though both can complete very fast, their clustering results are less representative.

TABLE III

Davies-Bouldin Index For Different Clustering Results

| Distance used In Eq. (14) | Parallel D2 | Parallel K-means | Hierarchical K-means |
|---|---|---|---|
| Squared Mallows | 1.55 | 2.99 | 2.01 |
| Squared $L_2$ | 1.69 | 5.54 | 2.04 |

Evaluation with Synthetic Data

Except for all the above experiments on real data, we also apply the algorithm on a synthetic dataset. The synthetic data are bags of weighted vectors. We carefully sample the vectors and their weights so that the data gather around several centroids, and their distances to the corresponding centroids follow the Gamma distribution, which means they follow a Gaussian distribution in a hypothetical space (Li and Wang, 2008). By using this dataset, we have some ideally distributed data with class labels.

We create a synthetic dataset containing 15 clusters, each composed of 100 samples around the centroid. The clusters are well separated. The upper bound for the number of clusters in the algorithm is set 20. It takes about 8 minutes to cluster the data (with 30 slave CPUs). Then 17 clusters are generated. We try to match these 17 clusters to the ground truth clusters: 9 of the 17 clusters are identical to their corresponding true clusters; 5 clusters with sizes close to 100 differ from the true clusters only by a small number of samples; 2 clusters combine precisely into one true cluster; and at last a small cluster of size 8 may have formed from some outliers. It is evident that for this synthetic dataset, the parallel D2-clustering has produced a result close to the ground truth.

CONCLUSIONS

A novel parallel D2-clustering algorithm with dynamic hierarchical structure is described. The algorithm can efficiently perform clustering operations on data that are represented as bags of weighted vectors. Due to the introduction of parallel computing, the speed of the clustering is orders of magnitude faster, compared to the original sequential D2-clustering algorithm. By deploying the parallel algorithm on multiple CPU cores, the time complexity of D2-clustering can be improved from high-ordered polynomial to linearithmic time, with minimal approximation introduced. The parallel D2-clustering algorithm can be embedded into various applications, including image concept learning, video clustering, and sequence clustering problems.

Because the initial data segmentation is relatively time consuming and the performance bottleneck of the current parallel D2-clustering algorithm, it may be advantageous to develop some simpler and more efficient approaches for the data segmentation. Vector quantization is adopted in the experiment, which demonstrates a good approach to reduce the data segmentation time. Other fast data segmentation approaches, e.g. the locality sensitive hashing (LSH) (Koga et al., 2007), should further optimize the algorithm.

The algorithm with multiple implementations may be executed under different software and hardware setups and environments. Currently an MPI implementation and a single CPU multi-thread version of the parallel algorithm are developed. Other implementations such as Hadoop and CUDA should prove useful for multiple purposes of the discrete distribution clustering. Some algorithmic modifications may be needed when importing the algorithm to different frameworks.

With the direct application scenario, large-scale image concept learning and annotation applications based on this algorithm may be developed. It is important to well design the learning and inference steps after the clustering.

REFERENCES

D. Arthur and S. Vassilvitskii. How slow is the K-means method? In Proc. 22th Annual Symposium on Computational Geometry, pages 144-153, 2006.

D. Arthur, B. Manthey, and H. Roglin. Smoothed analysis of the k-means method. Journal of the ACM, 58(5):19:1-19:31, 2011.

T. Batu. L. Fortnow, R. Rubinfeld, W. D. Smith, and P. White. Testing closeness of discrete distributions. Journal of the ACM, 60(1):4:1-4:25, 2013.

C. Beecks, A. M. Ivanescu, S. Kirchhoff, and T. Seidl. Modeling multimedia contents through probabilistic feature signatures. In Proc. 19th ACM International Conference on Multimedia, pages 1433-1436, 2011.

B. Boeckmann, A. Bairoch, R. Apweiler, M. C. Blatter, A. Estreicher, E. Gasteiger, M. J. Martin, K. Michoud, C. O'Donovan, I. Phan, S. Pilbout, and M. Schneider. The SWISS-PROT protein knowledgebase and its supplement TrEMBL in 2003. Nucleic Acids Research, 31(1):365-370, 2003.

E. Y. Chang, H. Bai, and K. Zhu. Parallel algorithms for mining large-scale rich-media data. In Proc. 7th ACM International Conference on Multimedia, pages 917-918, 2009.

Y. Chen and J. Z. Wang. Image categorization by learning and reasoning with regions. The Journal of Machine Learning Research. 5:913-939, 2004.

T. M. Cover and J. A. Thomas. Elements of Information Theory. John Wiley & Sons, 2012.

I. Daubechies. Ten Lectures on Wavelets. SIAM. 1992.

D. L. Davies and D. W. Bouldin. A cluster separation measure. IEEE Transactions on Pattern Analysis and Machine Intelligence, 1(2):224-227, 1979.

J. Dean and S. Ghemawat. MapReduce: Simplified data processing on large clusters. Communications of the ACM, 51(1):107-113, 2008.

I. Dhillon and D. Modha. A data-clustering algorithm on distributed memory multiprocessors. Large-Scale Parallel Data Mining, Lecture Notes in Artificial Intelligence, 1759:245-260, 2000.

R. O. Duda, P. E. Hart, and D. G Stork. Pattern Classification. John Wiley & Sons, 2012.

A. Garrow, A. Agnew, and D. Westhead. TMB-Hunt: An amino acid composition based method to screen proteomes for Beta-Barrel transmembrane proteins. BMC Bioinformatics, 6(1):56-71, 2005.

A. Gersho and R. M. Gray. Vector Quantization and Signal Compression. Springer, 1992.

Y. Huang. B. Niu, Y. Gao, L. Fu, and W. Li. Cd-hit suite: A web server for clustering and comparing biological sequences. Bioinformatics, 26(5):680-682, 2010.

N. Hulo, A. Bairoch, V. Bulliard, L. Cerutti, E. De Castro, P. S. Langendijk-Genevaux, M. Pagni, and C. J. A. Sigrist. The PROSITE database. Nucleic Acids Research, 34(suppl 1):227-230, 2006.

S. C. Johnson. Hierarchical clustering schemes. Psychometrika, 32(3):241-254, 1967.

C. Julien and L. Saitta. Image and image-set modeling using a mixture model. COMPSTAT 2008, pages 267-275, 2008.

S. Kantabutra and A. L. Couch. Parallel K-means clustering algorithm on NOWs. NECTEC Technical Journal, 1(6): 243-247, 2000.

L. V. Kantorovich. On the transfer of masses. In Dokl. Akad. Nauk. SSSR, pages 227-229, 1942.

D. Kelley and S. Salzberg. Clustering metagenomic sequences with interpolated Markov models. BMC Bioinformatics, 11(1):544-555, 2010.

A. Kislyuk, S. Bhatnagar, J. Dushoff, and J. Weitz. Unsupervised statistical clustering of environmental shotgun sequences. BMC Bioinformatics, 10(1):316-331, 2009.

H. Koga, T. Ishibashi, and T. Watanabe. Fast agglomerative hierarchical clustering algorithm using locality-sensitive hashing. Knowledge and Information Systems, 12(1):25-53, 2007.

A. Kumar, Y. Sabharwal, and S. Sen. Linear-time approximation schemes for clustering problems in any dimensions. Journal of the ACM, 57(2):5:1-5:32, 2010.

J. Li and J. Z. Wang. Real-time computerized annotation of pictures. IEEE Transactions on Pattern Analysis and Machine Intelligence, 30(6):985-1002, 2008.

R. Lienhart. Comparison of automatic shot boundary detection algorithms. In Proc. SPIE, volume 3656, pages 290-301, 1999.

Y. Linde. A. Buzo, and R. Gray. An algorithm for vector quantizer design. IEEE Transactions on Communications, 28(1):84-95, 1980.

J. MacQueen. Some methods for classification and analysis of multivariate observations. In Proc. 5th Berkeley Symposium on Mathematical Statistics and Probability, volume 1, pages 281-297, 1967.

C. L. Mallows. A note on asymptotic joint normality. Annals of Mathematical Statistics, 43(2): 508-515, 1972.

O. L. Mangasarian. Uniqueness of solution in linear programming. Linear Algebra and Its Applications, 25:151-162, 1979.

G. Monge. Mémoire sur la théorie des déblais et des remblais. De l'Imprimerie Royale, 1781.

K. G. Murty. Linear Programming, volume 57. Wiley New York, 1983.

A. Y. Ng, M. I. Jordon, and Y. Weiss. On spectral clustering: Analysis and an algorithm. Advances in Neural Information Processing Systems, 2:849-856, 2002.

C. Park. J. Z. Huang, and Y. Ding. Gplp: A local and parallel computation toolbox for Gaussian process regression. The Journal of Machine Learning Research, 13:775-779, 2012.

J. Pevsner. Bioinformatics and Functional Genomics. Wiley, 2003.

S. L. K. Pond, K. Scheffler, M. B. Gravenor, A. F. Y. Poon, and S. D. W. Frost. Evolutionary fingerprinting of genes. Molecular Biology and Evolution, 27(3):520-536, 2010.

S. T. Rachev and L. Ruschendorf. Mass Transportation Problems: Volume I: Theory, Volume II: Applications (Probability and Its Applications). Springer, 1998.

Y. Rubner, C. Tomasi, and L. J. Guibas. A metric for distributions with applications to image databases. In Proc. 6th International Conference on. Computer Vision, pages 59-66, 1998.

N. Sawant, J. Z. Wang, and J. Li. Enhancing training collections for image annotation: An instance weighted mixture modeling approach. IEEE Transactions on Image Processing, 22(3):3562-3577, 2013.

S. Z. Selim and M. A. Ismail. K-means-type algorithms: A generalized convergence theorem and characterization of local optimality. IEEE Transactions on Pattern Analysis and Machine Intelligence, 6(1):81-87, 1984.

D. A. Spielman and S. Teng. Smoothed analysis of algorithms: Why the simplex algorithm usually takes polynomial time. Journal of the ACM, 51(3):385-463, 2004.

Y. Tamada, S. Imoto, and S. Miyano. Parallel algorithm for learning optimal bayesian network structure. The Journal of Machine Learning Research, 12:2437-2459, 2011.

R. Thakur, R. Rabenseifner, and W. Gropp. Optimization of collective communication operations in MPICH. International Journal of High Performance Computing Applications, 19(1):49-66, 2005.

K. Voevodski, M. Balcan, H. R"oglin, S. Teng, and Y. Xia. Active clustering of biological sequences. The Journal of Machine Learning Research, 13:203-225, 2012.

X. Wan. A Novel Document Similarity Measure based on Earth Mover's Distance. Information Sciences, 177(18): 3718-3730, 2007.

Y. Wang, H. Bai, M. Stanton, W. Y. Chen, and E. Chang. Plda: Parallel latent Dirichlet allocation for large-scale applications. In Proc. 5th International Conference on Algorithmic Aspects in Information and Management, pages 301-314, 2009.

D. Xu and S. F. Chang. Video event recognition using kernel methods with multilevel temporal alignment. IEEE Transactions on Pattern Analysis and Machine Intelligence, 30(11):1985-1997, 2008.

A. Yanagawa, S. F. Chang, L. Kennedy, and W. Hsu. Columbia University's baseline detectors for 374 ISCOM semantic visual concepts. Columbia University ADVENT Technical Report, 2007.

A. Yavlinsky, E. Schofield, and S. R"uger. Automated image annotation using global features and robust nonparametric density estimation. Image and Video Retrieval, Lecture Notes in Computer Science, 3568:507-517, 2005.

D. Zhou, J. Li, and H. Zha. A new Mallows distance based metric for comparing clusterings. In Proc. 22nd International Conference on Machine Learning, pages 1028-1035, 2005.

The invention claimed is:

1. A method of determining similarities in still or moving images utilizing a hierarchical structure including a base level and higher levels, the method comprising the steps of:
   a) performing an initial segmentation of data objects in the base level into a plurality of segments using a master processor, each object being representative of a different image or video, the data objects included in the base level of the hierarchy being original data objects and a data set of the base level;
   b) performing a discrete distribution (D2) clustering on each of the segments on one or more slave processors to determine a group of clusters within the segment, each of the clusters corresponding to a local centroid;
   c) combining the local centroids within all of the segments determined in step b) into one global data set of local centroids and performing an initial segmentation of this global data set of local centroids into a plurality of segments using the master processor, the global data set of local centroids representing a higher level of the hierarchy, a size of the data set of the higher level being smaller than a size of data set of the previous level;
   d) iteratively repeating steps b) and c) at higher levels in the hierarchy until a single segmentation of the data objects is achieved, the number of centroids is reduced to a predefined number, or a predefined threshold based on distances of the data objects to the centroids is satisfied; and
   e) outputting information regarding the way in which the data objects are clustered in terms of similarity.

2. The method of claim 1, wherein the initial segmentation of the data objects is based upon adjacency.

3. The method of claim 1, wherein the D2 clustering operations are performed by parallel slave processors.

4. The method of claim 1, wherein the D2 clustering operations are performed by the slave processors in sequence.

5. The method of claim 1, including the steps of:
   assigning different cluster labels to the data objects within each segment; and
   optimizing the cluster labels of each data object to determine the local centroids.

6. The method of claim 1, including the step of imposing one or more constraints on the centroids passed to each level in the hierarchy.

7. The method of claim 1, wherein the cluster centroids passed to successively higher levels are weighted to maintain equal contributions from each original data object.

8. The method of claim 1, wherein the master processor distributes the data segments to different parallel slave processors to perform the D2-clustering at each level in the hierarchy.

9. The method of claim 8, including the use of synchronized Message Passing Interface (MPI) and MapReduce techniques to perform message passing and data transmission between the master and slave processors.

10. The method of claim 1, wherein the objects to be clustered are mathematically represented by discrete distributions or bags of weighted vectors.

11. The method of claim 1, wherein the series of discrete distribution (D2) clustering operations are performed by physically separate parallel processors or separate cores of an integrated device.

12. The method of claim 1, the step of performing an initial segmentation in a) or c) comprising:
   a) performing an initial clustering of the data objects or data set using a constrained discrete distribution (D2) clustering algorithm to divide the data into segments;
   b) performing a series of constrained D2 clustering operations on one or more of the segments to divide the data into additional segments, if necessary; and
   c) iteratively repeating step b), if necessary, until the size of each segment is reduced to an acceptable level, the number of segments increased to an acceptable level, or another stopping criterion is satisfied.

13. The method of claim 12, wherein the constraint includes a fixed weighting scheme on the support vectors of the discrete distributions that are the cluster centroids.

14. The method of claim 5, wherein the step of optimizing the cluster labels comprises iteration of updating the clusters based on nearest centroids from each data object and updating the centroids based on the updated clusters.

15. The method of claim 1, including the steps of assigning, at the master processor, each centroid as a cluster label to the data object in the corresponding cluster, the label propagating to all descendent in the previous levels.

16. The method of claim 1, wherein the combination of the local centroids of all of the segments in a hierarchical level is different from a set of centroids obtained if a D2-clustering is directly performed on all data of the data set in the hierarchical level.

17. A method of determining similarities in a biological process or genetic sequence utilizing a hierarchical structure including a base level and higher levels, the method comprising the steps of:
   a)) performing a segmentation of data objects in the base level into a plurality of segments using a master processor, each data object being representative of a different biological process or genetic sequence, the data objects included in the base level of the hierarchy being original data objects and a data set of the base level;
   b) performing a discrete distribution (D2) clustering on each of the segments on one or more slave processors to determine a group of dusters within each of the segments, each of the clusters corresponding to a local centroid;
   c) combining the local centroids within all of the segments determined in step b) into one global data set of local centroids and performing a segmentation of this global data set of local centroids into a plurality of segments using the master processor, the global data set of local centroids representing a higher level of the hierarchy, a size of the data set of the higher level being smaller than a size of the data set of the previous level;
   d) iteratively repeating steps b) and c) at higher levels in the hierarchy until a single segmentation of the data objects is achieved, the number of centroids is reduced to a predefined number, or a predefined threshold based on distances of the data objects to the centroids is satisfied; and
   e) outputting information regarding the way in which the data objects are clustered in terms of similarity.

* * * * *